United States Patent
Lim et al.

(10) Patent No.: US 12,552,845 B2
(45) Date of Patent: Feb. 17, 2026

(54) ADHESIVE ELASTIN AND SUCKERIN-BASED MULTIBLOCK COPOLYPEPTIDE WITH STIMULUS RESPONSIVENESS AND SURFACE ADHESION, SELF-ASSEMBLED STRUCTURE THEREOF, AND APPLICATION OF INJECTABLE HYDROGEL AS BIOADHESIVE

(71) Applicant: INDUSTRY-UNIVERSITY COOPERATION FOUNDATION HANYANG UNIVERSITY ERICA CAMPUS, Gyeonggi-do (KR)

(72) Inventors: Dong Woo Lim, Seoul (KR); Jae Hee Lee, Busan (KR); Aamna Basheer, Gyeonggi-do (KR)

(73) Assignee: INDUSTRY-UNIVERSITY COOPERATION FOUNDATION HANYANG UNIVERSITY ERICA CAMPUS, Gyeonggi-do (KR)

( * ) Notice: Subject to any disclaimer, the term of this patent is extended or adjusted under 35 U.S.C. 154(b) by 0 days.

(21) Appl. No.: 17/998,864

(22) PCT Filed: Aug. 25, 2021

(86) PCT No.: PCT/KR2021/011329
§ 371 (c)(1),
(2) Date: Nov. 15, 2022

(87) PCT Pub. No.: WO2022/045751
PCT Pub. Date: Mar. 3, 2022

(65) Prior Publication Data
US 2023/0174597 A1  Jun. 8, 2023

(30) Foreign Application Priority Data
Aug. 25, 2020 (KR) .......... 10-2020-0106701
Aug. 24, 2021 (KR) .......... 10-2021-0111312

(51) Int. Cl.
*C07K 14/78* (2006.01)
*C07K 14/435* (2006.01)
*C12N 15/70* (2006.01)

(52) U.S. Cl.
CPC ........ *C07K 14/43504* (2013.01); *C07K 14/78* (2013.01); *C12N 15/70* (2013.01); *C07K 2319/735* (2013.01)

(58) Field of Classification Search
CPC .............. C07K 14/43504; C07K 14/78; C07K 2319/735; C12N 15/70; C08J 3/075; C08L 89/00
See application file for complete search history.

(56) References Cited

U.S. PATENT DOCUMENTS 10,899,803 B2 * 1/2021 Guerette .............. B29C 48/022

FOREIGN PATENT DOCUMENTS

| KR | 20170040748 | 4/2017 |
|----|-------------|--------|
| KR | 20170115929 | 10/2017 |
| KR | 20180113181 | 10/2018 |
| WO | 2008033847 | 3/2008 |

OTHER PUBLICATIONS

Pena-Francesch et al., Squid-Inspired Tandem Repeat Proteins: Functional Fibers and Films, Feb. 21, 2019, Frontiers in Chemistry, 7:69, 1-16 (Year: 2019).*
Hiew et al., "Squid Suckerin Biomimetic Peptides Form Amyloid-like Crystals with Robust Mechanical Properties," Biomacromolecules, 2017, vol. 18.
Deepankumar et al., "Supramolecular β-Sheet Suckerin-Based Underwater Adhesives," Advanced Functional Materials, 2020.
Liu, "Strong Fibers Based on Squid Protein and Elastin," ChemViews Magazine, 2020.
WIPO, International Search Report for PCT/KR/2021/011329, Nov. 30, 2021.

* cited by examiner

Primary Examiner — Sharmila G Landau
Assistant Examiner — Ashley T White
(74) Attorney, Agent, or Firm — Hodgson Russ LLP

(57) ABSTRACT

The present disclosure relates to an adhesive elastin and suckerin-based multiblock copolypeptide with stimulus responsiveness and surface adhesion, a self-assembled structure thereof, and application of an injectable hydrogel as a bioadhesive.

5 Claims, 22 Drawing Sheets
Specification includes a Sequence Listing.

(A)

(B)

EBP-SBP mono blocks

EBP(E1): IPAKG IPAYG IPAKG IPAYG IPAKG   SPB(S1): PGAATVSHTTHHAPGYGYGGLLGGLGLHY

ABA tri-block synthesis

(i) En-Sn di-block synthesis (ii) Sn-En-Sn tri-block synthesis

BAB tri-block synthesis

(i) Sn-En di-block synthesis (ii) En-Sn-En tri-block synthesis (A)

(B)

(A)

(B)

ADHESIVE ELASTIN AND SUCKERIN-BASED MULTIBLOCK COPOLYPEPTIDE WITH STIMULUS RESPONSIVENESS AND SURFACE ADHESION, SELF-ASSEMBLED STRUCTURE THEREOF, AND APPLICATION OF INJECTABLE HYDROGEL AS BIOADHESIVE

CROSS-REFERENCE TO RELATED APPLICATIONS

This application is a U.S. national phase entry of International Application No. PCT/KR2021/011329, filed Aug. 25, 2021, which claims priority to Korean Application No. 10-2021-0111312, filed Aug. 24, 2021, and Korean Application No. 10-2020-0106701, filed Aug. 25, 2020, the entire disclosures of which are incorporated herein by reference.

SEQUENCE LISTING

The instant application contains a Sequence Listing which has been submitted in .txt format and is hereby incorporated by reference in its entirety. Said .txt copy was created on Nov. 10, 2022, is named "083972-00023_ST25.txt", and is 3,876 bytes in size.

TECHNICAL FIELD

The following description relates to an adhesive elastin and suckerin-based multiblock copolypeptide with stimulus responsiveness and surface adhesion, a self-assembled structure thereof, and application of an injectable hydrogel as a bioadhesive.

BACKGROUND ART

Protein-based biomaterials containing natural and synthetic amino acids have received great attention because amino acid sequences and molecular weights thereof are precisely controlled at molecular levels and have unique physicochemical properties according to various covalent and non-covalent bonds. In particular, stimulus responsiveness and its sophisticated regulation are one of unique properties of protein-based biomaterials. Proteins with stimulus responsiveness have significant morphological changes by a stimulant such as pH, temperature, ions, and ligands, and are used as a building block of a self-assembled structure such as micelles, vesicles, and hydrogels formed by the changes thereof. Therefore, the stimulus-responsive biomaterials may be variously used in a biomedical field.

Elastin-based polypeptides (EBPs) derived from mammalian elastin are stimulus-responsive biomaterials, and physicochemical properties thereof are changed according to a temperature. Multiple pentapeptide repeating units Val/Ile-Pro-Gly/Ala-Xaa-Gly (SEQ ID NO:14) undergo a reversible reverse phase transition at a lower critical solution temperature (LCST), i.e., the transition temperature (Tt), wherein the Xaa may be all amino acids except for proline (P). Since the EBP is hydrophilic, the EBP is soluble at a temperature lower than the LCST, and when the temperature rises above the LCST, the EBPs are aggregated and changed to be insoluble. In general, the physicochemical properties of the EBP are precisely controlled according to the ratio and composition of amino acids and the number of repetitions of pentapeptide as a guest residue located at position 4 of the pentapeptide repeating unit. More specifically, the guest residue and the repeating unit of the pentapeptide affect Tt, and a third amino acid of the pentapeptide unit determines the flexibility of the EBP. For example, when the third amino acid of the pentapeptide unit is glycine (G), the EBP exhibits flexibility, but in the case of alanine (A) at the same position, the EBP has more rigid properties. Depending on a unique combination of pentapeptide repeats, EBPs with intrinsic physicochemical properties and Tt exhibit new functions by forming a self-assembled structure such as micelles and hydrogels according to a temperature trigger or by introducing functional amino acids into the guest residue, such as adhesion or coordination with metal ions.

Recently, bioadhesive proteins, such as mussel byssal protein and squid sucker constituent protein, have attracted attention as biomaterials, particularly in tissue engineering and regenerative medicine fields. These adhesion proteins inspired by the adhesion of mussels under harsh and humid conditions all have 3,4-dihydroxyphenylalanine (DOPA) as a hydroxylated form of tyrosine (Y) to adhere to the surface through various interactions between DOPA molecules and adhesion surface molecules, and increases adhesion through interaction between lysine (K) and $\pi$-cation.

Recently, a new type of protein, suckerin, has been reported in squid sucker ring teeth (SRT), and is a block copolymer consisting of a glycine (Gly) and tyrosine (Tyr)-rich module M2 and an alanine (Ala) and histidine (His)-rich module M1 to form a region of a β-sheet structure within an amorphous matrix. An A1H1 sequence (peptide sequence AATAVSHTTHHA (SEQ ID NO:12) of the module M1), which is mainly found in the suckerin protein family, is self-assembled similarly to a crystal structure in an aqueous solution, and a β-sheet distance is 4.4 and 5.4 Å to form very dense self-assembled nanocrystals. These β-sheet nanocrystals serve as physical and reversible cross-linking through hydrogen bonding and impart dynamic mechanical properties of the material.

The present inventors conducted many studies to develop biocompatible materials with stimulus responsiveness and adhesion to various surfaces that may be used as bioadhesives. As a result, the present inventors designed and prepared a multiblock copolypeptide with high adhesion self-assembled through the fusion of an adhesive elastin-based polypeptide (EBP) and a suckerin-based polypeptide (SBP) with self-assembly ability in a β-sheet structure and confirmed that a multiblock copolypeptide modified into DOPA exhibited stronger adhesion by hydroxylating a tyrosine residue of the multiblock copolypeptide, and then completed the present disclosure.

DISCLOSURE OF THE INVENTION

Technical Goals

An aspect provides a multiblock copolypeptide comprising an adhesive elastin-based polypeptide (EBP) and a suckerin-based polypeptide (SBP).

Another aspect provides a gene for expressing the multiblock copolypeptide, a recombinant vector containing the gene, and a recombinant microorganism containing the vector.

Yet another aspect provides a method for preparing the multiblock copolypeptide, in particular, a method for preparing a multiblock copolypeptide in which a tyrosine residue is modified into DOPA.

Still another aspect provides self-assembled nanostructure and hydrogel formed of the multiblock copolypeptide, and a method for preparing the same.

Still yet another aspect provides a self-assembled nanostructure formed of the multiblock copolypeptide as a drug carrier and provides an adhesive composition and a biobond comprising a hydrogel formed of the multiblock copolypeptide.

However, technical objects of the present disclosure are not limited to the aforementioned purposes and other objects which are not mentioned may be clearly understood to those skilled in the art from the following description.

Technical Solutions

According to an aspect, there is provided a multiblock copolypeptide including or consisting of a suckerin-based polypeptide (SBP) and an adhesive elastin-based polypeptide (EBP).

In an example embodiment, the SBP may include tyrosine (Y), and the EBP may include tyrosine (Y) and/or lysine (K). The tyrosine residue may be hydroxylated to be modified into 3,4-dihydroxyphenylalanine (DOPA), and in the multiblock copolypeptide, the tyrosine residue may be hydroxylated to be modified into DOPA.

In another example embodiment, the multiblock copolypeptide may consist of any one arrangement selected from a group consisting of $(SBP)_n(EBP)_m$; $(EBP)_m(SBP)_n$; $(SBP)_n(EBP)_m(SBP)_n$; and $(EBP)_m(SBP)_n(EBP)_m$, in which n and m may be integers of 1 or more, n may be the number of repetitions of the SBP, and m may be the number of repetitions of the EBP.

In yet another example embodiment, the EBP may consist of an amino acid sequence represented by the following Formula 1:

[Formula 1]
(SEQ ID NO: 13)
[IPAXG IPAXG IPAXG IPAXG IPAXG IPAXG]$_m$

In Formula 1, the m may be an integer of 1 or more, and may be the number of repetitions of Formula 1; and the X may be any one or more selected from the group consisting of tyrosine (Y), lysine (K), and isoleucine (I).

In yet another example embodiment, in Formula 1, m may be 6, and X of each of the repeating pentapeptides may consist of tyrosine (Y) and lysine (K) at a ratio of 2:4, consist of tyrosine (Y) and lysine (K) at a ratio of 3:3, consist of tyrosine (Y), lysine (K), and isoleucine (I) at a ratio of 2:2:2, or consist of tyrosine (Y) and lysine (K) at a ratio of 4:2.

In yet another example embodiment, the SBP may be a block consisting of Pro-M1-Pro-M2 or repeatedly including Pro-MT-Pro-M2, in which the M1 may be a domain including or consisting of an amino acid sequence of SEQ ID NO: 9, and the M2 may be a domain including or consisting of an amino acid sequence of SEQ ID NO: 10.

According to another aspect, there is provided a gene encoding the multiblock copolypeptide, a recombinant vector including the gene, and a recombinant microorganism into which the gene or the recombinant vector is introduced.

In an example embodiment, the recombinant microorganism may be additionally introduced with a tyrosinase gene or a recombinant vector for expressing the gene in addition to the multiblock copolypeptide gene or a recombinant vector for expressing the multiblock copolypeptide gene to co-express the multiblock copolypeptide and the tyrosinase.

According to yet another aspect, there is provided a method for preparing a multiblock copolypeptide including the following steps:

(1) expressing a multiblock copolypeptide by culturing the recombinant microorganism; and
(2) dissolving the recombinant microorganism and purifying the multiblock copolypeptide through inverse transition cycling (ITC).

In an example embodiment, the expressing of the multiblock copolypeptide of step (1) may be induced by adding IPTG to a recombinant microorganism culture medium.

In another example embodiment, the method may further include modifying a tyrosine residue into 3,4-dihydroxyphenylalanine (DOPA) by contacting the purified multiblock copolypeptide with mushroom-derived tyrosinase, after step (2).

According to yet another aspect, there is provided a nanostructure formed by self-assembling the multiblock copolypeptide based on a β-sheet structure of an SBP, in which the nanostructure may have a vesicular or micellar structure.

In an example embodiment, the multiblock copolypeptide of the nanostructure may be modified into DOPA and the DOPA may be oxidized. The oxidation of the DOPA may be naturally occurring oxidation or induced by treatment with a chemical oxidant, for example, $NaIO_4$.

According to yet another aspect, there are provided a drug carrier and an adhesive composition including the nanostructure.

According to yet another aspect, there is provided a hydrogel formed by self-assembling the multiblock copolypeptide based on a β-sheet structure of an SBP, and the multiblock copolypeptide of the hydrogel may be modified into DOPA and the DOPA may be oxidized DOPA. The oxidized DOPA may be naturally oxidized or induced by treatment of a chemical oxidant.

According to yet another aspect, there are provided an adhesive composition and a bioadhesive composition including the hydrogel.

Advantageous Effects

The present disclosure relates to a multiblock copolypeptide in which a suckerin-based polypeptide (SBP) and an adhesive elastin-based polypeptide (EBP) are fused. The multiblock copolypeptide may be self-assembled based on the β-sheet structure of the SBP to form a nanostructure and a hydrogel, and in order to strengthen the surface adhesion of the nanostructure and the hydrogel, there is provided a method of modifying a tyrosine residue of the multiblock copolypeptide into DOPA, or inducing the oxidation of the modified DOPA. The multiblock copolypeptide of the present disclosure may form self-assembled nanostructure and hydrogel capable of reversibly changing depending on temperature and/or pH stimuli, and is expected to be usefully used in biomedical fields such as drug carriers, biocoating agents, and bioadhesives due to its strong surface adhesion even under wet conditions.

BRIEF DESCRIPTION OF DRAWINGS

FIG. 2 is a schematic diagram of EBP-SBP di-block copolypeptide synthesis (A), a DNA agarose gel electrophoresis image of an EnSn gene cleaved with XbaI and BamHI (B), and a copper-stained SDS-PAGE image of a purified EnSn di-block copolypeptide (C).

FIG. 9 is a schematic diagram of a design of an EBP-SBP tri-block copolypeptide, the preparation of self-assembled structure and hydrogel thereof, and a structure thereof.

BEST MODE FOR CARRYING OUT THE INVENTION

Figure 1:
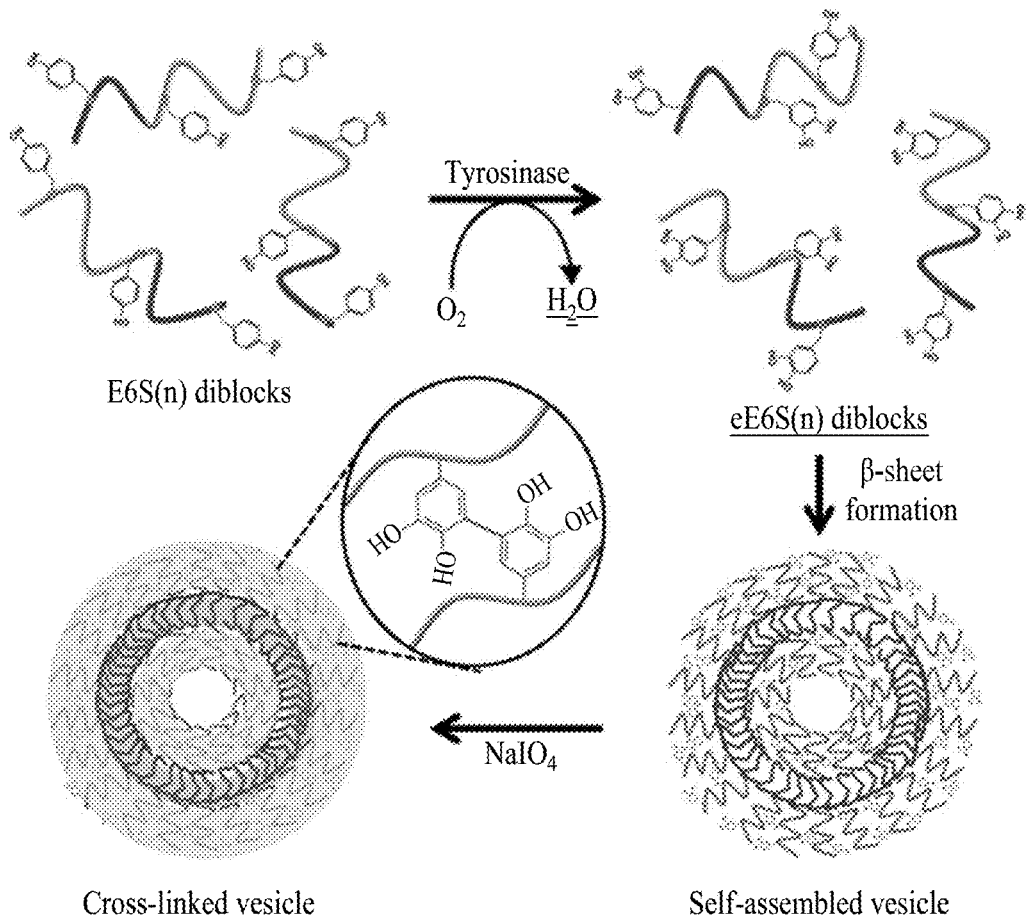
FIG. 1 is a schematic diagram of amino acid sequences of EBP and SBP mono blocks. IPAYG IPAKG IPAYG IPAKG IPAYG IPAKG is SEQ ID NO:5 and PGAATVSHTTHHAPGYGYGGLLGGLGLHY is SEQ ID NO:15. (A) and a process of forming a nanostructure by self-assembling hydroxylated EBP-SBP di-blocks (B). Tyrosine residues to be hydroxylated in the EBP and SBP mono blocks are highlighted (A). The tyrosine residues of the EBP and SBP blocks are modified into DOPA by mushroom tyrosinase or a bacterial co-expression system, and EBP-SBP self-assembled nanostructures into a β-sheet structure of an SBP block are chemically cross-linked by $NaIO_4$ oxidation of DOPA residues.

In the present disclosure, the term "amino acid" refers to a natural amino acid or an artificial amino acid, and preferably a natural amino acid. For example, the amino acid means glycine, alanine, serine, valine, leucine, isoleucine, methionine, glutamine, asparagine, cysteine, histidine, phenylalanine, arginine, tyrosine, tryptophan or the like. The properties of the amino acid are well known in the art. Specifically, the amino acid exhibits hydrophilicity (negatively charged or positively charged) or hydrophobicity, and also exhibits aliphatic or aromatic properties.

In the present disclosure, an amino acid sequence is abbreviated as follows according to the IUPAC-IUB nomenclature.

arginine (Arg, R), Lysine (Lys, K), histidine (His, H), serine (Ser, S), threonine (Thr, T), glutamine (Gln, Q), asparagine (Asp, N), methionine (Met, M), leucine (Leu, L), isoleucine (Ile, I), valine (Val, V), phenylalanine (Phe, F), tryptophan (Trp, W), tyrosine (Tyr, Y), alanine (Ala, A), glycine (Gly, G), proline (Pro, P), cysteine (Cys, C), aspartic acid (Asp, D), glutamic acid (Glu, E), norleucine (Nle)

As used herein, the term "polypeptide" refers to any polymer chain of amino acids. The terms "peptide" and "protein" may be used interchangeably with the term of polypeptide, and also refer to a polymer chain of amino acids. The term "polypeptide" includes a natural or synthetic protein, a protein fragment, and a polypeptide analog of a protein sequence. The polypeptide may be a monomer or a polymer.

In the present disclosure, the term "copolypeptide" refers to a polypeptide that is a copolymer.

As used herein, the term "phase transition" refers to a change in state of a material, such as a change from water into steam or from ice into water.

The fusion polypeptide of the present disclosure basically includes elastin-based polypeptides (EBPs) and suckerin-based polypeptides (SBPs) having stimulus responsiveness. The "elastin-based polypeptide" is also called "elastin-like polypeptides (ELPs)". The term is a term widely used in the technical field of the present disclosure. A detailed description of the EBP is described in detail in Korean Patent Publication No. 2017-0040748 of the present inventors.

The EBP is subjected to a reversible phase transition at a lower critical solution temperature (LCST), also called a transition temperature (Tt). These EBPs are highly soluble at less than Tt, but become insoluble when the temperature is higher than Tt. In the present disclosure, the fusion of the EBP block contributes to the thermal reactivity properties along with the adhesive properties of the multiblock copolypeptide.

In the present disclosure, the physicochemical properties of the EBP are mainly controlled by a combination of Val-Pro-(Gly or Ala)-Xaa-Gly (SEQ ID NO: 14), which is a pentapeptide repeating unit. Specifically, a third amino acid of the repeating unit determines relative mechanical properties. For example, in the present disclosure, the third amino acid, Gly, determines elasticity, or Ala determines plasticity. The elasticity or plasticity is a property shown after transition.

In the present disclosure, the Xaa (or X) is referred to as a "guest residue". Various types of EBPs according to the present disclosure may be prepared by variously introducing the Xaa. On the other hand, both the hydrophobicity of the guest residue Xaa, which is the fourth amino acid and the multimerization of pentapeptide repeating units affect Tt. Depending on the Tt, the EBP may exhibit hydrophilicity or hydrophobicity.

The EBP according to the present disclosure may be a polypeptide in which pentapeptides are repeated, and the repeated polypeptides may form a polypeptide block (EBP block).

The SBP is a block copolymer consisting of a module M2 in which glycine (Gly) and tyrosine (Tyr) are rich and a module M1 in which alanine (Ala) and histidine (His) are rich to form a β-sheet structure in an aqueous solution to be self-assembled, and the self-assembled nanostructure has a crystal-like structure due to a very tight alignment of the β-sheets. The M1 domain of the SBP forms a f-sheet structure that induces self-assembly and the M2 domain provides an amorphous matrix. Proline (Pro) is present at an N-terminus of M1 and is involved in nano-confinement of the β-sheet.

In the present disclosure, the SBP consists of Pro-MT-Pro-M2, and may be a polypeptide with repeating Pro-MT-Pro-M2, and the repeated polypeptides may form a polypeptide block (SBP block).

The present disclosure provides a multiblock copolypeptide in which the EBP block and the SBP block are fused, and the copolypeptide provides self-assembled nanostructure and hydrogel by forming the β-sheet structure of the SBP.

The length of the SBP block in the multiblock copolypeptide of the present disclosure affects a diameter of the nanostructure formed by self-assembly of the multiblock copolypeptide. As the length of the SBP block increases, the diameter of the nanostructure decreases, which suggests that the formation of the β-sheet increases through intramolecular and intermolecular interactions according to an increase in length of the SBP block.

The self-assembled nanostructure and hydrogel themselves have surface adhesion, but a nanostructure having a smaller diameter and a dense hydrogel may be prepared by cross-linking between each blocks and molecules by modifying the tyrosine residue of the multiblock copolypeptide into 3,4-dihydroxyphenylalanine (DOPA) and the prepared nanostructure and hydrogel exhibit stronger surface adhesion. Furthermore, it is possible to induce the oxidation of DOPA in the nanostructure and the hydrogel to further improve the surface adhesive strength. In this case, quinone, which is an oxidized form of DOPA, remarkably strengthens the adhesion of the nanostructure and the hydrogel unlike known to be involved in the improvement of cohesion.

The present disclosure provides a gene for the preparation of the multiblock copolypeptide, a recombinant vector including the gene, and a recombinant microorganism into which the vector is introduced.

Meanwhile, as described above, the preparation of the multiblock copolypeptide modified into DOPA with enhanced adhesion may be achieved by reacting the multiblock copolypeptide with mushroom-derived tyrosinase to induce hydroxylation of the tyrosine residue. A gene encoding the tyrosinase or an expression vector including the gene is additionally introduced into the recombinant microorganism into which the vector for expressing the multiblock copolypeptide is introduced to be achieved through a bacterial co-expression system.

In the present disclosure, the vector refers to a DNA product containing a polynucleotide encoding a target protein operably linked to a suitable regulatory sequence so as to express the target protein in a suitable host cell. The regulatory sequence may include a promoter capable of initiating transcription, any operator sequence for regulating such transcription, a sequence encoding a suitable mRNA ribosome-binding site, and a sequence for regulating the termination of transcription and translation, and may be prepared variously according to a purpose. The promoter of the vector may be constitutive or inductive. The vector may be transformed into a suitable host cell, and then replicated or functioned regardless of a host genome or integrated into a genome itself.

The vector to be used in the present disclosure is not particularly limited as long as the vector is replicable in the host cell, and may use any vector known in the art. Examples of commonly used vectors may include native or recombinant plasmids, phagemids, cosmids, viruses, and bacteriophages. For example, as the phage vector or the cosmid vector, pWE15, M13, λMBL3, λMBL4, λIXII, λASHII, λAPII, λt10, λt11, Charon4A, and Charon21A may be used, and as the plasmid vector, pBR-based, pUC-based, pBluescriptII-based, pGEM-based, pTZ-based, pCL-based, and pET-based plasmid vectors may be used. The vectors usable in the present disclosure are not particularly limited, and known expression vectors may be used.

As used herein, the term "expression vector" is a recombinant carrier into which a heterologous DNA fragment is inserted, and generally refers to a double-stranded DNA fragment. Here, heterologous DNA refers to heterologous DNA, which is DNA not found naturally in a host cell. When the expression vector is once present in the host cell, the expression vector may replicate independently of host chromosomal DNA and several copies of the vector and its inserted (heterologous) DNA may be produced.

A wide variety of expression host/vector combinations may be used to express the gene encoding the multiblock copolypeptide of the present disclosure. Expression vectors suitable for eukaryotic hosts include expression regulatory sequences derived from, for example, SV40, bovine papillomavirus, adenovirus, adeno-associated virus, cytomegalovirus and retrovirus. Expression vectors that can be used in bacterial hosts include bacterial plasmids, which may be exemplified by those obtained from *E. coli*, such as pBluescript, pGEX2T, pUC vector, colE1, pCR1, pBR322, pMB9 and derivatives thereof, plasmids with a wider host range, such as RP4, phage DNA, which may be exemplified by a wide variety of phage lambda derivatives such as λgt10, λgt11, and NM989, and other DNA phages such as M13 and filamentous single-stranded DNA phage. Expression vectors useful for yeast cells are plasmids and derivatives thereof. A vector useful for insect cells is pVL 941.

A host cell transformed or transfected with the above-described expression vector constitutes another aspect of the present disclosure. As used herein, the term "transformation" means that foreign DNA is introduced into a host to allow DNA to be replicated as an extrachromosomal factor or by chromosomal integration completion. As used herein, the term "transfection" means that an expression vector is accepted by a host cell whether or not any coding sequence is actually expressed.

The host cell of the present disclosure refers to a recombinant microorganism into which a vector having a polynucleotide encoding one or more target proteins has been introduced, or a recombinant microorganism transfected so that a polynucleotide encoding one or more target proteins is introduced into the microorganism and the polynucleotide is integrated into a chromosome to express the target protein. The host cell may be a prokaryotic or eukaryotic cell. In addition, a host having high DNA introduction efficiency and high expression efficiency of the introduced DNA is usually used. Examples of the host cell to be used include well-known eukaryotic and prokaryotic hosts such as *Escherichia coli, Pseudomonas, Bacillus, Streptomyces*, fungi, and yeast, insect cells such as *Spodoptera frugiperda* (SF9), animal cells such as CHO and mouse cells, African green monkey cells such as COS 1, COS 7, BSC 1, BSC 40 and BMT 10, and tissue cultured human cells. In the case of using COS cells, since an SV40 large T antigen is expressed in the COS cells, a plasmid having a replication origin of SV40 exists as a multiple-copy episome in the cells, and higher expression than a normal may be expected. The introduced DNA sequence may be obtained from the same species as the host cell, may be of a different species from the host cell, or may be a hybrid DNA sequence comprising any heterologous or homologous DNA.

In the present disclosure, "co-expression" means that two or more genes are expressed simultaneously, and in the present disclosure, expressed as "coexpression".

Further, the present disclosure provides a method for preparing an EBP-SBP multiblock copolypeptide including culturing a recombinant microorganism into which the multiblock copolypeptide expression vector is introduced; inducing expression of a multiblock copolypeptide by treating the microorganism with IPTG; and purifying the multiblock copolypeptide by dissolving the microorganism and performing inverse transition cycling (ITC).

In addition, for the preparation of an EBP-SBP multiblock copolypeptide modified into DOPA, the preparing method further includes reacting the purified multiblock copolypeptide with mushroom-derived tyrosinase, or the cultured microorganism may be used as a recombinant microorganism into which a vector for tyrosinase expression is additionally introduced.

In addition, the present disclosure provides a nanostructure prepared by self-assembly of the multiblock copolypeptide based on the β-sheet structure of SBP. The nanostructure may have a vesicular structure or a micellar structure depending on the length of the SBP block, and the nanostructure may be provided as a drug delivery system using structural properties or may be provided for manufacturing an adhesives and a biobond using strong surface adhesion.

In addition, the present disclosure provides a hydrogel prepared by self-assembly of the multiblock copolypeptide based on the β-sheet structure of the SBP, and the hydrogel has strong surface adhesion, which may be used for the preparation of the adhesive and the biobond.

In the present disclosure, a core-shell structure refers to a micellar structure, and the micelle generally refers to a thermodynamically stable and uniform spherical structure formed by low molecular weight substances having an amphiphilic group, for example, both hydrophilic and hydrophobic groups. When an insoluble drug is dissolved in a compound having the micellar structure and injected, the drug is present inside the micelle, and these micelles may perform target-directed drug release in response to changes in temperature or pH in the body, so that the potential for application as a drug delivery carrier is very high. Therefore, the nanostructure in which the multiblock copolypeptide of the present disclosure is self-assembled may also be utilized as a drug carrier.

In another aspect of the present disclosure, the hydrogel prepared by forming a cross-link between the block polypeptides by a temperature stimulation of the multiblock co-polypeptide has mechanical flexibility similar to that of an actual tissue and contains a lot of water. However, since the binding of the gel is not broken by water, it is actively applied to medical adhesives that require adhesion to wet biological surfaces containing moisture and require resistance even to external moisture. Therefore, the hydrogel having excellent tissue adhesion according to the present disclosure can be used for various biomedical applications, such as tissue adhesive or hemostatic agent, tissue engineering supports, drug delivery carriers, tissue fillers, wound healing, or intestinal adhesion prevention.

The bioadhesive, that is, the biobond composition of the present disclosure, may be used in various areas, such as skin, blood vessels, digestive organs, cranial nerves, plastic surgery, orthopedic surgery, and the like by replacing a cyanoacrylic adhesive, a fibrin-based adhesive, or the like that is mainly used in the market today. For example, a biocompatible bioadhesive of the present disclosure may replace a suture for surgery, may be used to occlude unnecessary blood vessels, and used for hemostasis and suturing of soft tissues such as face tissues and cartilage, and hard tissues such as bones and teeth, and can be applied as a household medicine. The various application fields of the biocompatible bioadhesive composition of the present disclosure are summarized as follows.

In an example embodiment, the bioadhesive of the present disclosure may be applied to the inner and outer surfaces of the human body, that is, the bioadhesive of the present disclosure may be applied topically to an external surface of the human body, such as the skin, or to the surface of an internal organ exposed during a surgical operation. In addition, the bioadhesive of the present disclosure may be used to adhere a damaged part of a tissue, seal an air/fluid from being leaked from a tissue, adhere a medical device to a tissue, or fill a defective part of a tissue. As used herein, the term "biological tissue" includes but not particularly limited to, for example, skin, bone, nerve, axon, cartilage, blood vessel, cornea, muscle, fascia, brain, prostate, breast, endometrium, lung, spleen, small intestine, liver, testis, ovaries, cervix, rectum, stomach, lymph nodes, bone marrow, kidneys, and the like.

In another example embodiment, the bioadhesive of the present disclosure may be used for wound healing. For example, the biocompatible bioadhesive of the present disclosure may be used as a dressing applied to a wound.

In another example embodiment, the bioadhesive of the present disclosure may be used for skin closure. That is, the bioadhesive of the present disclosure may be applied topically and used to close the wound, and may replace a suture. In addition, the bioadhesive of the present disclosure may be applied to hernia restoration, and for example, may be used for surface coating of a mesh used for hernia restoration.

In another example embodiment, the bioadhesive of the present disclosure may also be used for suturing and preventing leakage of vascular structures such as blood vessels. In addition, the bioadhesive of the present disclosure may be used for hemostasis.

In yet another example embodiment, the bioadhesive of the present disclosure may be used as an anti-adhesion agent after surgery. The adhesion, which occurs in all surgical sites, is a phenomenon in which other tissues adhere to the wound around the surgical sites. The adhesion occurs about 97% of the time after surgery, and 5 to 7% of the adhesion causes a serious problem. In order to prevent the adhesion, it is possible to minimize the wound during surgery or use an anti-inflammatory agent. In addition, in order to prevent the formation of fibrin, a tissue plasminogen activator (TPA) is activated or a physical barrier such as a crystalline solution, a polymer solution, or a solid membrane is used, but these methods may exhibit toxicity in vivo and have other side effects. The bioadhesive of the present disclosure may be applied to tissue exposed after surgery to prevent adhesion between the tissue and surrounding tissues.

In addition, in yet another aspect, the present disclosure provides a surgical suture, a tissue engineering support, and the like including the hydrogel.

Tissue engineering technology refers to a technology of preparing a cell-support complex by culturing cells isolated from a patient's tissue on a support, and then transplanting the prepared cell-support complex back into the human body, and the tissue engineering technology has been applied to the regeneration of almost all organs in the human body, such as artificial skin, artificial bone, artificial cartilage, artificial cornea, artificial blood vessel, and artificial muscle. The bioadhesive hydrogel of the present disclosure may provide a support (scaffold) similar to a living tissue in order to optimize the regeneration of biological tissues and organs in the tissue engineering technology. In addition, an artificial extracellular matrix may be conveniently implemented using the support of the present disclosure, and may be used as a medical material, such as cosmetics, wound dressings, and dental matrices.

Various physiologically active substances involved in the actions of promoting the growth and differentiation of cells through interaction with the cells or tissues of the human body and helping the regeneration and recovery of tissues may be easily adhered to the hydrogel of the present disclosure. In addition, the physiologically active substances are also a generic term for various biomolecules that may be included to implement an artificial extracellular matrix having a structure similar to that of a natural extracellular matrix. The physiologically active substances may include cells, proteins, nucleic acids, sugars, enzymes, and the like, and examples thereof may include cells, proteins, polypeptides, polysaccharides, monosaccharides, oligosaccharides, fatty acids, nucleic acids, and the like, preferably cells. The cells may be all cells including prokaryotic cells and eukaryotic cells, for example, may immune cells and embryonic cells including osteoblasts, fibroblasts, hepatocytes, neurons, cancer cells, B cells, white blood cells, and the like. In addition, the physiologically active substances include plasmid nucleic acid as a nucleic acid substance, hyaluronic acid, heparin sulfate, chondroitin sulfate, and algin salt as a sugar substance, and a hormone protein as a protein substance, but not limited thereto.

MODE FOR CARRYING OUT THE INVENTION

The present disclosure may have various modifications and various example embodiments and specific example embodiments will be illustrated in the drawings and described in detail in the detailed description. However, this does not limit the present disclosure within specific example embodiments, and it should be understood that the present disclosure covers all the modifications, equivalents and replacements within the idea and technical scope of the present disclosure. In the interest of clarity, not all details of the relevant art are described in detail in the present specification in so much as such details are not necessary to obtain a complete understanding of the present disclosure.
[Materials]

A pET-21a(+) vector and BL21(DE3) *E. coli* cells were purchased from Novagen Inc. (Madison, Wi), and top10 cells were purchased from Invitrogen (Carlsbad, CA). Oligonucleotides were chemically synthesized by Cosmo Gene Tech (Seoul, South Korea). Heat-sensitive alkaline phosphatase, FastAP and restriction endonucleases, BamHI and XbaI were purchased from Fermentas (Ontario, Canada), and BseRI and AcuI were purchased from New England Biolabs (Ipswich, MA). T4 DNA ligase was purchased from Elpis Bio-tech (Taejeon, South Korea). DNA miniprep, gel extraction, and PCR purification kits were purchased from Geneall Biotechnology (Seoul, South Korea). Dyne Agarose High was purchased from DYNE BIO, Inc. (Seongnam, South Korea). All Top10 cells were cultured in a TB DRY medium purchased from MO BIO Laboratories, Inc. (Carlsbad. CA), and BL21 (DE3) cells were cultured in a Circle Grow medium purchased from MP Biomedicals (Solon, OH). Ready gels (Tris-HCl 2-20%) used as precast gels were purchased from Bio-Rad (Hercules, CA), and phosphate buffered saline (PBS, pH 7.4), ampicillin, polyethyleneimine (PEI), sodium periodate and mushroom tyrosinase were purchased from Sigma-Aldrich (St Louis, MO).

EXAMPLES

Example 1. Preparation of Gene Structure for Preparing EBP and SBP Mono Blocks and Di-Blocks An SBP block gene was consisted of Pro-M1-Pro-M2, and M1 and M2 block genes were independently synthesized to be fused to the SBP block gene. The SBP block gene in which the M1 and M2 block genes were fused was named "Sn", wherein n represents the number of repetitions of S1 and Pro-M1-Pro-M2. An adhesive EBP block, EBP[Y2K4]n, containing a repeating unit, Ile-Pro-Ala-Xaa-Gly (SEQ ID NO:14) of the pentapeptide was named as "En", wherein n means the number of 6 repeating pentapeptides, capital letters in parentheses refer to a guest residue amino acid (Xaa) at position 4 in each pentapeptide unit, and a subscript refers to a proportion of guest residues in the repeating pentapeptides. An EBP6-SBPn di-block was named "E6Sn", wherein n represented the number of repetitions of the SBP block.

First, M1 and M2 expression cassettes were inserted into separate modified mpET-21a(+) vectors, respectively. Specifically, two oligonucleotides of each block gene were annealed, 50 μL of a T4 DNA ligase buffer containing each nucleotide at a concentration of 2 μM was heated at 95° C. for 2 minutes and then cooled slowly at room temperature for 3 hours to form a dsDNA cloning insert. Then, 20 pmol of the annealed dsDNA and 0.1 pmol of a linearized mpET-21a(+) vector were mixed in a T4 DNA ligase buffer containing T4 DNA ligase, and reacted at 16° C. for 30 minutes to insert a modified cloning insert having BseRI and AcuI adhesive ends to the linearized mpET-21a(+) vector. After the cloning vector was chemically transformed into competent *E. coli* Top 10 cells, the transformed cells were transferred to an SOC plate containing 50 μg/mL ampicillin. The inserted base sequence was confirmed by DNA sequencing.

Figure 2A:
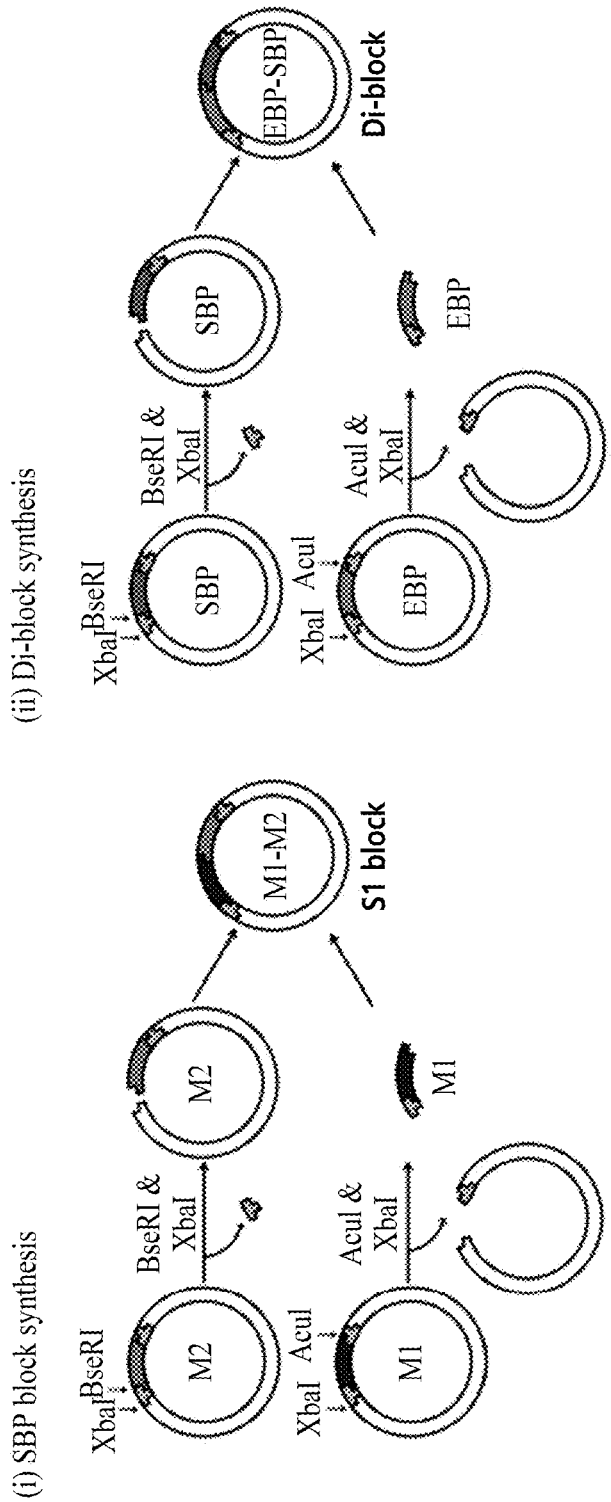
FIG. 2A(i) is a schematic diagram of a process of constructing an S1 plasmid by inserting an M1 gene into an M2 plasmid, and FIG. 2A(ii) is a schematic diagram of a process of constructing a plasmid for preparing an SBP block and an EBP-SBP di-block copolypeptide by inserting an En gene into an Sn plasmid.

Thereafter, for S1 block gene synthesis, the plasmid containing the M2 block gene was linearized with XbaI and BseRI, and the plasmid containing the M1 block gene was cleaved with the same restriction enzyme and then the M1 block gene was inserted into the plasmid containing the M2 block gene (FIG. 2A). The S1 block gene was multiplexed in the same manner as above through RDL until the required repeating units were obtained (FIG. 2A(i)). In addition, an E6 block gene was inserted into the plasmid containing the Sn block gene to synthesize an EBP-SBP di-block copolypeptide gene (FIG. 2A(ii)). Specifically, three types of di-block copolypeptide genes, E6S3, E6S6 and E6S12, were synthesized to study an effect of the SBP block length on the self-assembly of E6Sn.

Figures 2B, 2C:
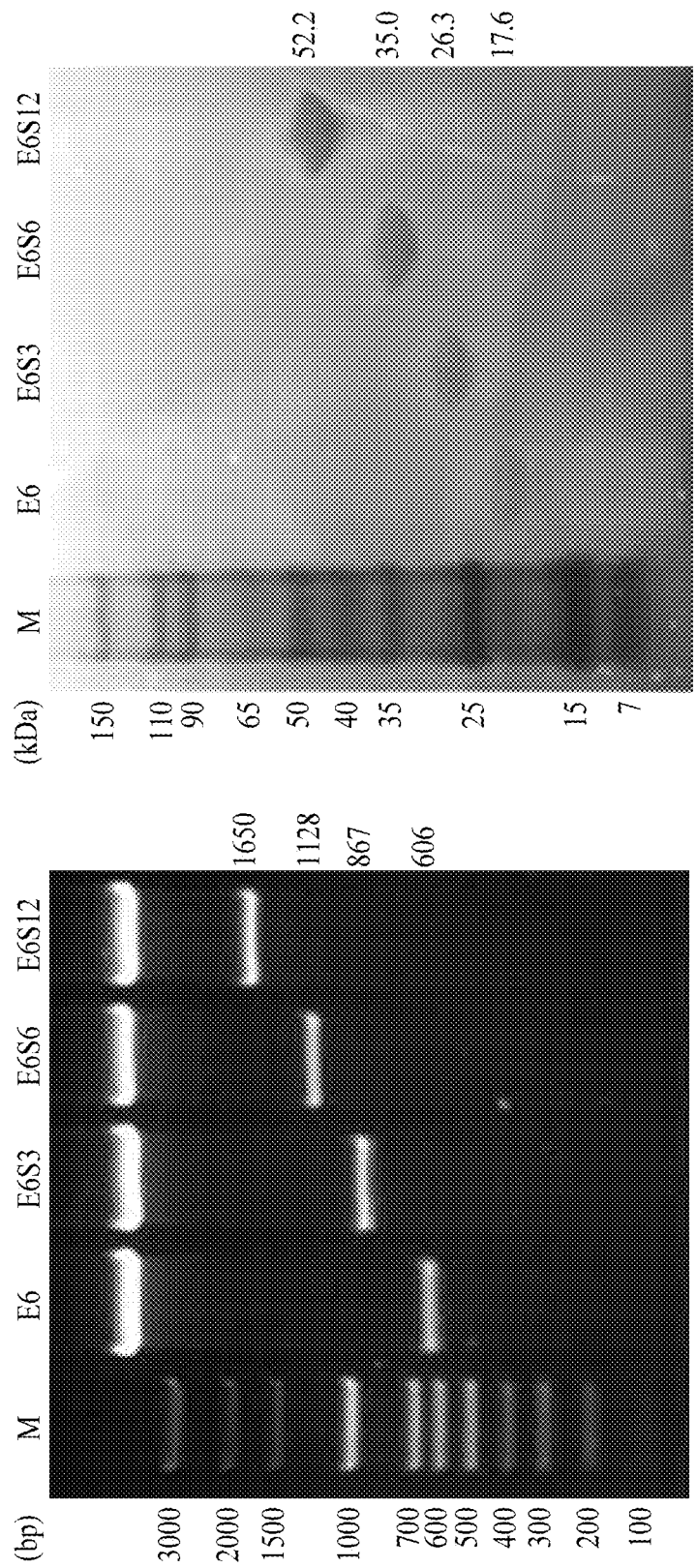
In FIGS. 2B and 2C, the sizes of standard markers are shown on the left and expected sizes thereof are shown on the right.

The length of all block genes was cleaved with XbaI and BamHI and then confirmed by agarose gel electrophoresis and DNA sequencing, and the electrophoresis results were illustrated in FIG. 2B. The size of the E6Sn di-block gene varied from 606 bp to 1650 bp including an adapter sequence (66 bp). A DNA standard marker size in bp unit was indicated on the left, and an expected size of the E6Sn di-block gene was indicated on the right of a gel image.

Gene sequences of adhesive EBPs were shown in Table 1 below, and amino acid sequences were shown in Table 2 below. Table 3 showed amino acid sequences of the M1 and M2 blocks constituting the SBP. Table 4 showed base sequences of di-block copolypeptides and the expected molecular weights of the EBP-SBP di-blocks.

TABLE 1

| EBP | | | | | | | |
|---|---|---|---|---|---|---|---|
| EBP [Y$_2$K$_4$] | ATC CCG GCC AAA GGC ATT CCT GCA TAC GGT ATC CCG GCC AAA GGC ATC CCG GCC AAA GGC ATT CCT GCA TAC GGT ATC CCG GCC AAA GGC | | | | | | SEQ ID NO: 1 |
| EBP [Y$_3$K$_3$] | ATT CCT GCA TAC GGT ATC CCG GCC AAA GGC ATT CCT GCA TAC GGT ATC CCG GCC AAA GGC ATT CCT GCA TAC GGT ATC CCG GCC AAA GGC | | | | | | SEQ ID NO: 2 |
| EBP [Y$_2$K$_2$I$_2$] | ATT CCG GCC TAC GGC ATC CCG GCA AAA GGC ATT CCT GCA ATT GGC ATT CCG GCC TAC GGC ATC CCG GCA AAA GGC ATT CCT GCA ATT GGC | | | | | | SEQ ID NO: 3 |
| EBP [Y$_4$K$_2$] | ATT CCG GCC TAC GGC ATC CCG GCA AAA GGC ATT CCG GCC TAC GGC ATT CCG GCC TAC GGC ATC CCG GCA AAA GGC ATT CCG GCC TAC GGC | | | | | | SEQ ID NO: 4 |

TABLE 2

| EBP [Y$_2$K$_4$] | IPAKG IPAYG IPAKG IPAKG IPAYG IPAKG | SEQ ID NO: 5 |
|---|---|---|
| EBP [Y$_3$K$_3$] | IPAYG IPAKG IPAYG IPAKG IPAYG IPAKG | SEQ ID NO: 6 |
| EBP [Y$_2$K$_2$I$_2$] | IPAYG IPAKG IPAIG IPAYG IPAKG IPAIG | SEQ ID NO: 7 |
| EBP [Y$_4$K$_2$] | IPAYG IPAKG IPAYG IPAYG IPAKG IPAYG | SEQ ID NO: 8 |

TABLE 3

| M1 | PGAATVSHTTHHA | SEQ ID NO: 9 |
|---|---|---|
| M2 | PGYGYGGLLGGLGLHY | SEQ ID NO: 10 |

TABLE 4

| Di-block copolypeptides | Nucleotide chain length (bp) | M.W (kDa) |
|---|---|---|
| E6S3 | 867 | 26.3 |
| E6S6 | 1128 | 35.0 |
| E6S12 | 1650 | 52.2 |

Example 2. Expression and Purification of EBP-SBP Di-Block

The plasmid containing the above-described gene structure was transformed into *E. Coli* BL21 (DE3) cells, and a single bacterial colony was inoculated into 10 mL of a CG medium (1st primary culture) containing 50 µg/mL ampicillin and cultured at 37° C. overnight at 180 rpm. The culture solution was inoculated with 400 mL of the CG medium added with 50 µg/mL ampicillin as a primary culture solution in a 2 µL flask and cultured at 37° C. at 200 rpm for 4 hours. Thereafter, 15 mL of the culture solution was inoculated with 500 mL of the CG medium added with 50 µg/mL ampicillin as a secondary culture solution in a 2 L flask and cultured for 3 hours, and then added with IPTG so that a final concentration was 1 mM to induce the expression.

The cells were harvested after 12 hours by centrifugation, and cell pellets were suspended in 5% acetic acid containing 8 M urea to prevent self-assembly of the SBP block. Subsequently, the harvested cells were sonicated with a sample (VC-505, Sonic and materials Inc, Danbury, CT) at 60% power (10 sec on, 30 sec off) for 5 minutes in ice water to obtain a cell lysate. The EBP-SBP di-block was purified through inverse transition cycling (ITC), and centrifuged at 16,000 rpm at 4° C. for 20 minutes during ITC to isolate a cell debris and an aqueous lysate was transferred to a new tube. NaCl was added to be a final concentration of 2M to trigger a phase transition, and the aggregated EBP-SBP di-blocks were isolated by centrifugation at 16,000 rpm at 40° C. for 20 minutes. The purified sample was dialyzed against 1% acetic acid to remove urea and salts and lyophilized.

The purity and the molecular weight of the EBP-SBP di-block copolypeptide were analyzed by SDS-PAGE and stained with a 0.3 M copper chloride solution. All block copolypeptides were successfully purified by ITC 3 to 4 times, and the yield of the purified blocks was >300 mg per liter of culture.

Copper-staining SDS-PAGE gel images of E6 and E6Sn were shown in FIG. 2C. As illustrated in FIG. 2C, it was confirmed that E6Sn moved according to an expected molecular weight (MW), whereas E6 moved higher than the expected MW. It is determined because the EBP is performed to 20% larger than the expected MW in SDS-PAGE. In FIG. 2C, the MW of the protein standard size marker is indicated on the left, and the expected molecular weight of each block is indicated on the right.

Example 3. Hydroxylation of Tyrosine Residue in EBP-SBP Di-Blocks

3-1. Hydroxylation Using Mushroom Tyrosinase

A tyrosine residue of an E6Sn di-block copolypeptide was converted into DOPA using mushroom-derived tyrosinase (Sigma Aldrich, T3824). The E6Sn di-block copolypeptide was suspended in a 10 mM sodium phosphate buffer containing 10 mM sodium borate, and added so that the final concentration of the mushroom-derived tyrosinase was up to 20 unit/mL after adjusting the acidity to pH 5.0 using ascorbic acid. The mixed solution was incubated with gentle shaking at room temperature (RT) for 3 hours. The tyrosinase-treated E6Sn di-block copolypeptide was subjected to phase transition by adding 2 M NaCl, and purified by centrifugation at 40° C. for 10 minutes at 16,000 rpm to remove tyrosinase.

3-2. Hydroxylation Using Bacterial Co-Expression System

The hydroxylation of the tyrosine residue of the EBP-SBP di-block was performed through a bacterial co-expression system during an *E. coli* expression process. A hydroxylated mEBP-SBP di-block was prepared by culturing BL21(DE3) cells containing a pET21a(+) vector for EBP-SBP di-block expression or a pACYC duet vector for tyrosinase expression containing orf438 in a medium. Aggregated mEBP-SBP block copolypeptides (mEBP-SBPs) were suspended in a 5% acetic acid solution containing 8 M urea and centrifuged at 16,000 rpm at 4° C. for 15 minutes to remove insoluble contaminants. To prevent oxidation of DOPA, mEBP-SBPs were dialyzed in a 1% acetic acid solution and freeze-dried.

The hydroxylated mEBP-SBP di-block copolypeptide is called mE6Sn.

3-3. Performance of SDS-PAGE and NBT/Glycinate Staining

Figure 3:
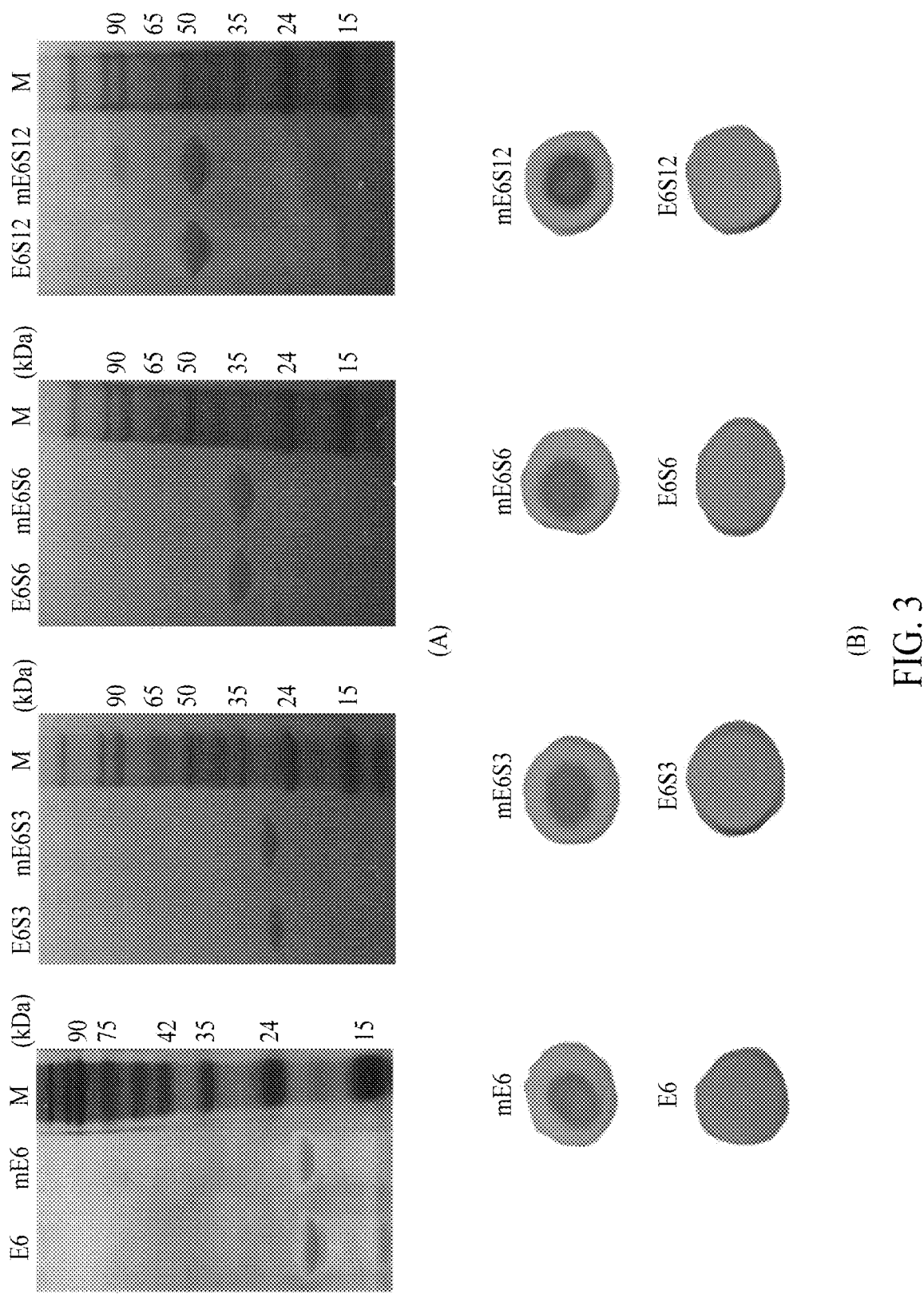
FIG. 3 is a copper-stained SDS-PAGE image of an EBP-SBP di-block and a hydroxylated mEBP-SBP di-block (A) and a result of confirming the modification of a tyrosine residue into DOPA in each block through NBT/glycinate staining (B).

DOPA-modified copolypeptides and di-block copolypeptides were identified by performing SDS-PAGE. As can be seen in FIG. 3(A), E6 and E6S3 moved larger than expected MW in SDS-PAGE after DOPA formation. Subsequently, the modification of DOPA was specifically confirmed by performing NBT/Glycinate staining by redox cycling. FIG. 3(B) illustrates a result of NBT/Glycinate staining, and the hydroxylation of E6Sn stained in purple and a non-hydroxylated block copolypeptide stained in yellow as a control group may be identified.

Figure 4:
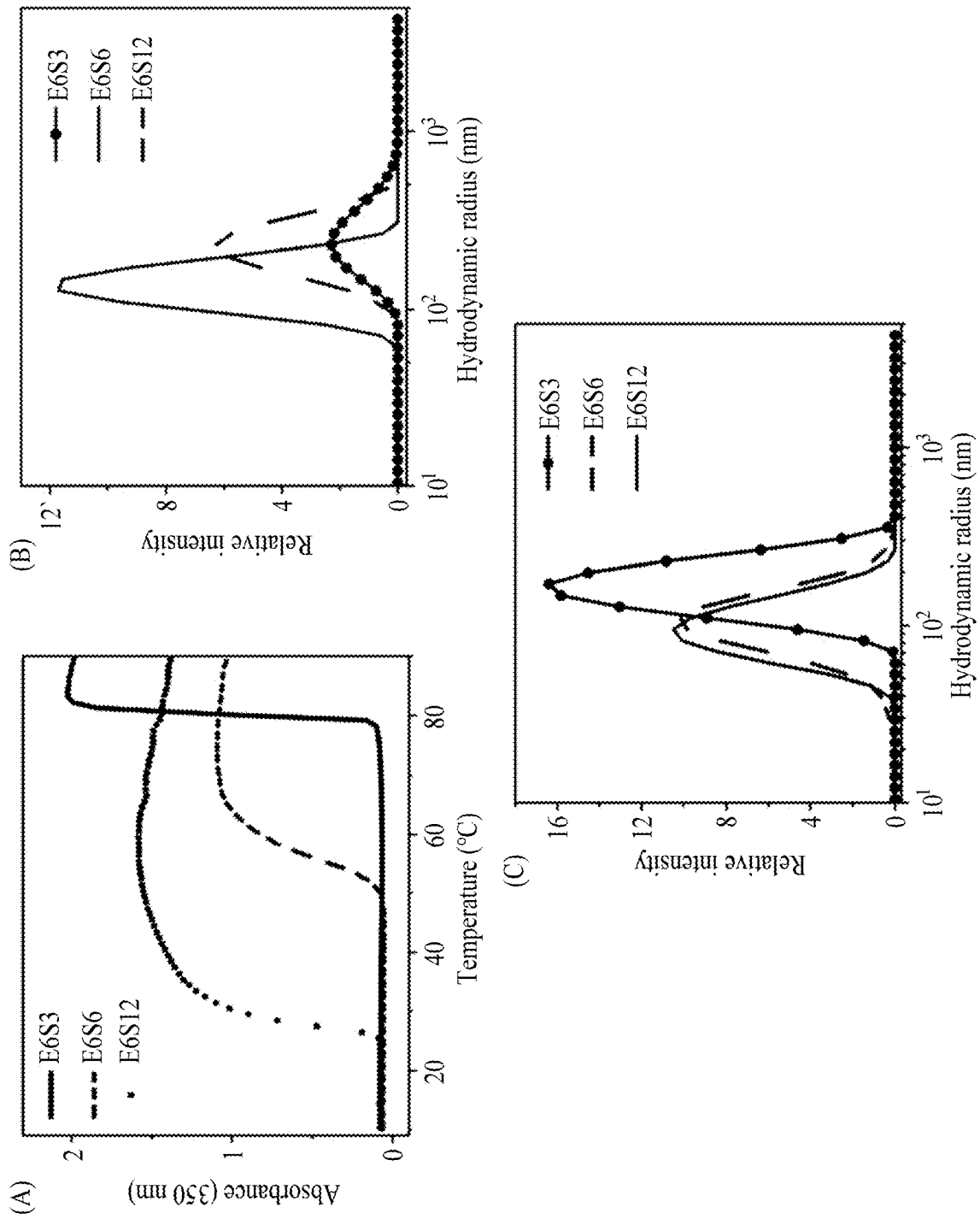
FIG. 4A is a turbidity profile of an EBP-SBP di-block in a phosphate buffer (10 mM, 5.0 pH) containing 0.5 M NaCl as a temperature function.
FIGS. 4B and 4C illustrate hydrodynamic radii ($R_h$) of EBP-SBP (B) and hydroxylated mEBP-SBP (C) measured through DLS in a phosphate buffer (10 mM, 5.0 pH) at room temperature.

Example 4. Confirmation of Characteristics of EBP-SBP Di-Block Copolypeptides The phase transition of a polypeptide was characterized by measuring the absorbance ($OD_{350}$) using a UV-visible spectrophotometer in a phosphate buffer (10 mM, pH 5.0) containing 0.5 M NaCl with a temperature function at a heating rate of 1° C./min at 350 nm in the range of 10° C. to 90° C. An LCST cloud point was calculated as a temperature at which a first derivative function of turbidity was maximum as a function of temperature (d(OD)/dT). As a result, as can be seen in FIG. 4(A), the thermal properties of E6Sn showed that the LCSTs of E6S3, E6S6 and E6S12 were 81° C., 46° C., and 23° C., respectively.

Then, the self-assembly of the di-block copolypeptide was confirmed by measuring hydrodynamic radii $R_h$ of E6Sn and hydroxylated mE6Sn di-blocks at a concentration of 25 µM in a phosphate buffer (10 mM, pH 5.0) using dynamic light scattering (DLS) at room temperature. The $R_h$ values measured in the self-assembled structure with di-blocks before/after modification of a tyrosine residue of E6Sn series were summarized in Table 5 below.

TABLE 5

| EBP-SBP diblocks | $R_{h(nm)}$ | |
|---|---|---|
| | Befor modification | After modification |
| E6S3 | 266.7 ± 47.97 | 192.1 ± 12.00 |
| E6S6 | 238.5 ± 41.72 | 109.4 ± 17.54 |
| E6S12 | 140.8 ± 14.14 | 100.6 ± 5.18 |

As a result, it can be seen that the hydrodynamic radii $R_h$ of the E6S3, E6S6 and E6S12 nanostructures are 266.7±47.97 nm, 238.5±41.72 nm and 140.8±14.14 nm, respectively, and the size of each nanostructure decreased as the SBP block length is increased (FIG. 4(B)). This suggests that as the length of the SBP block increases, the β-sheet formation of the SBP block may potentially increase through intramolecular and intermolecular interactions. Meanwhile, it can be seen that an average $R_h$ of mE6S3, mE6S6 and mE6S12 in which DOPA is formed by hydroxylation of a tyrosine residue were 192.1±12.00 nm, 109.4±17.54 nm, and 100.6±5.18 nm, respectively, and then the size of mE6Sn nanostructure decreases after DOPA formation. This is assumed to be caused by the oxidation of DOPA to dopaquinone during the purification process.

Samples were maintained to be equilibrated for 10 minutes before light scattering measurement, and the measurement was performed 11 times at each temperature.

Then, in order to confirm the nanostructures observed through DLS, transmission electron microcopy (TEM) and scanning electron microscopy (SEM) analysis were performed to image the nanostructures formed through self-assembly. The TEM images were taken by immersing a carbon-coated TEM grid in a 25 μM sample using a JEM-2100F FE-STEM (JEOL, Germany) operated at an accelerating voltage of 80 to 200 kV, drying the sample with a filter paper, and negatively staining with 2% phosphotungstic acid (PTA). The TEM images were taken before and after modification of a tyrosine residue into DOPA, and 15 structures randomly selected from the TEM images were measured to determine an average size of self-assembled nanostructures of E6Sn and hydroxylated mE6Sn.

Figure 5:
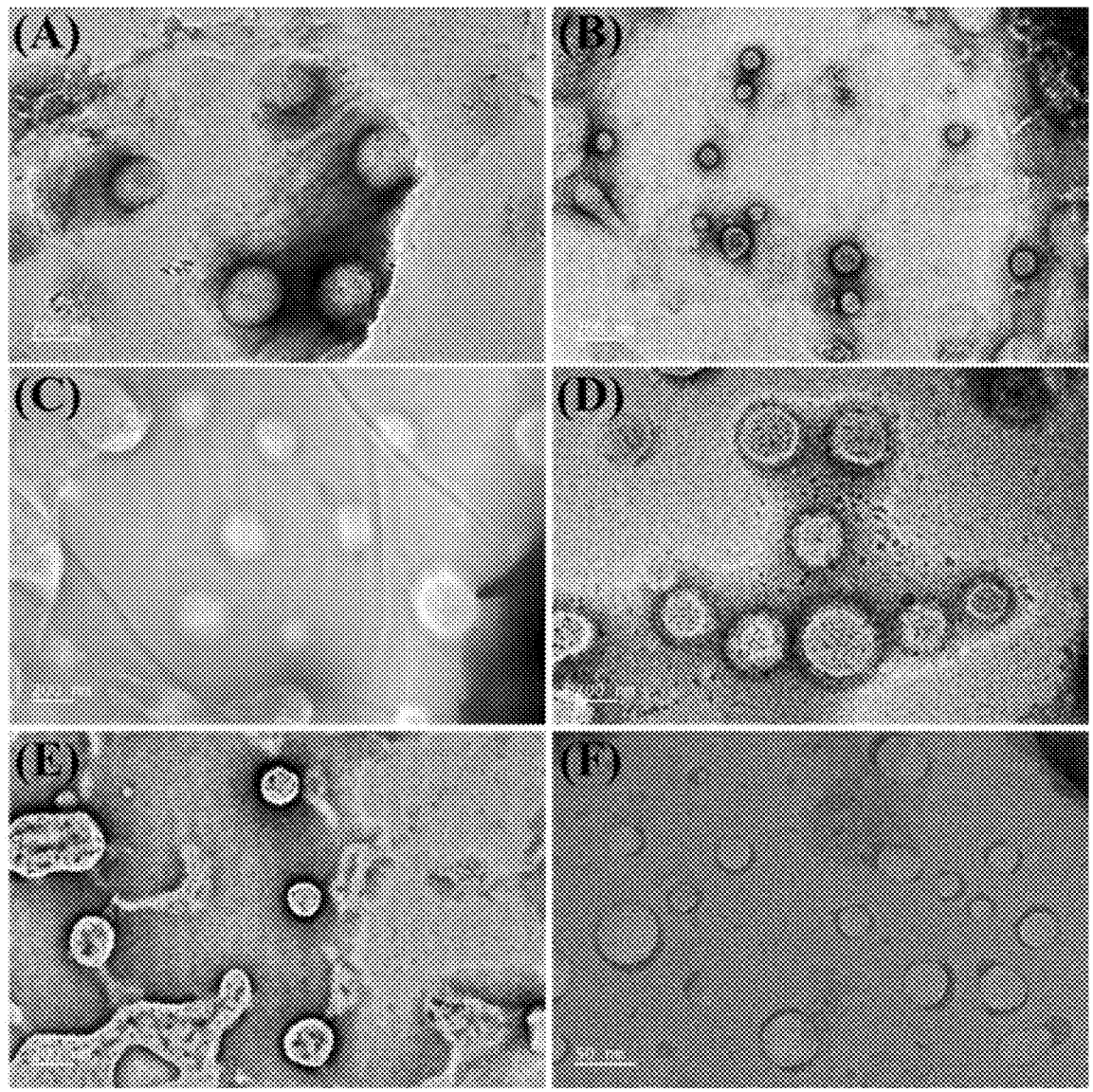
FIG. 5 is a TEM image for confirming the self-assembly of E6S3 (A), E6S6 (C), E6S12 (E) and hydroxylated mE6S3 (B), mE6S6 (D), mE6S12 (E). All samples were negatively stained with PTA and dried at room temperature, and scale bars are 200 nm (A to E) and 50 nm (F).

As a result, as can be seen in FIG. 5, the average sizes of E6S3 and hydroxylated mE6S3 nanostructures were 237.4±20.76 nm and 140.5±50.48 nm, respectively, and the average sizes of E6S6 and mE6S6 nanostructures were 260.78±10.59 nm and 200.26±15.62 nm, respectively, and the average sizes of E6S12 and mE6S12 nanostructures were 170.32±5.72 nm and 70.29±20.40 nm, respectively. It was confirmed that as the length of the SBP block increased, the size of the self-assembled nanostructure gradually decreased. This is determined to be caused by the high-density packing of the β-sheet constituting the SBP block. In addition, modification of a tyrosine residue into dopamine induced enhancement of pi-cation molecular interactions, thereby reducing the sizes of self-assembled nanostructures, which was a result consistent with DLS analysis. All images clearly showed a white vesicle layer stained with PTA.

For characterization by SEM (VEGA-SB3; TESCAN, Czech Republic), 3 μL of the sample was dropped onto a silicon wafer and dried at room temperature. SEM images were taken with a focused beam at 0.5 to 30 kV and the sample was coated with a thin conductive platinum layer using a K575X Turbo sputter coater (Emitech Ltd, Ashford, UK).

Figure 6:
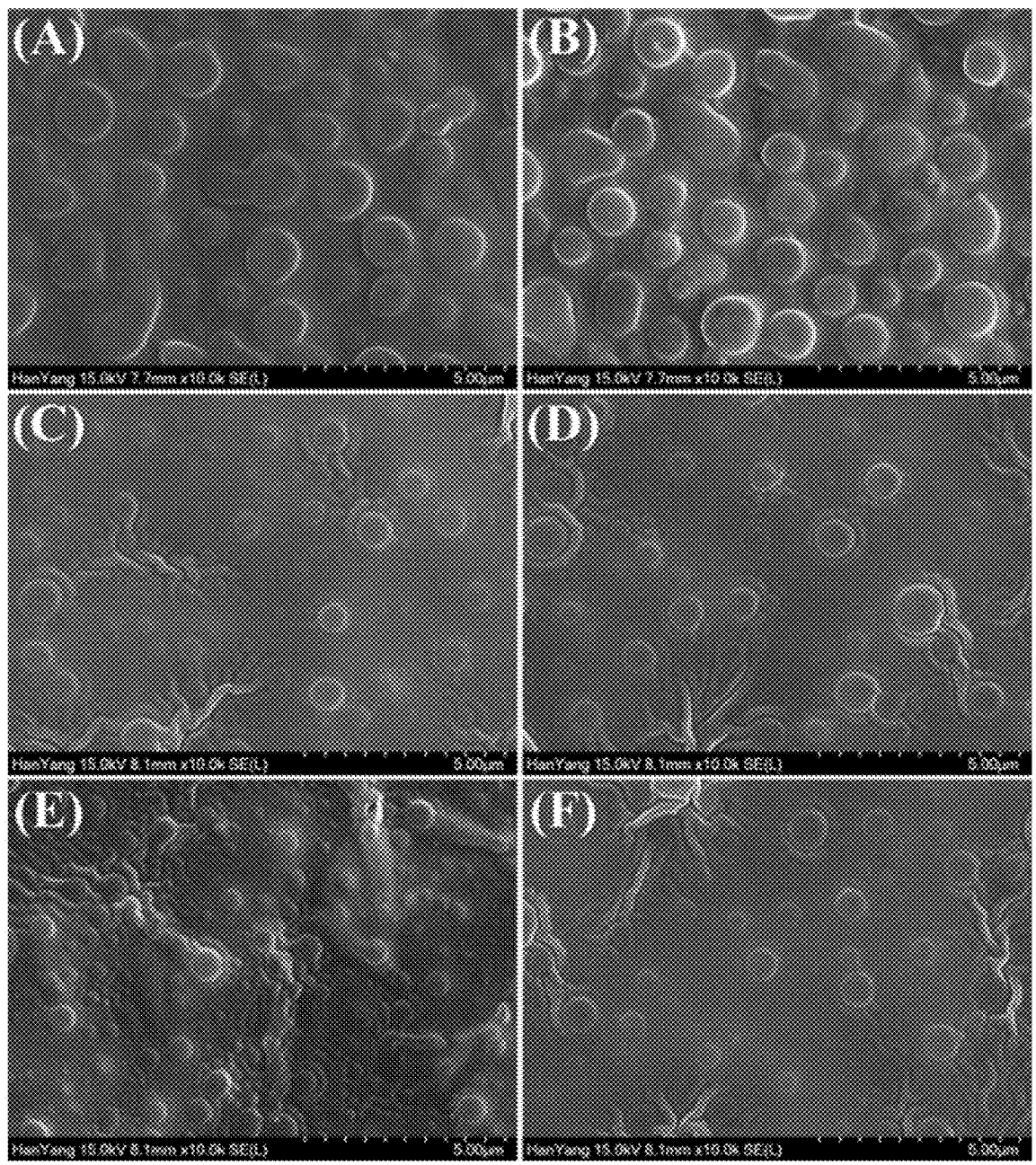
FIG. 6 is an SEM image for confirming the self-assembly of E6S3 (A), E6S6 (C), E6S12 (E) and hydroxylated mE6S3 (B), mE6S6 (D), mE6S12 (E). All samples were dried at room temperature, and the scale bar in each image is 5 μm.

The SEM images were shown in FIG. 6, and it was confirmed that the tyrosine modification of the SBP and EBP blocks in the nanostructures of E6Sn and hydroxylated mE6Sn through β-sheet-induced self-assembly of the SBP block did not affect self-assembly. The average sizes of E6Sn nanostructures according to an SBP block length were 787±233 nm, 649±120 nm, and 636±148 nm, respectively, and the SEM image statistics were also consistent with the DLS analysis.

SEM and TEM images were taken of EBP-SBP di-block nanostructures before/after modification of a tyrosine residue into DOPA at room temperature. The TEM and SEM images were randomly selected to analyze the average sizes of the nanostructures.

Example 5. Confirmation of Surface Adhesion of Hydroxylated mEBP-SBP Di-Block Nanostructures To visualize the adhesion of a hydroxylated mEBP-SBP di-block, a lysine residue of the EBP block was labeled with FITC. The mEBP-SBP di-block was dissolved in a sodium bicarbonate buffer containing 8 M urea, and FITC dissolved in dimethyl sulfoxide was added dropwise to a solution at a molar ratio of 1:1. The reaction mixture was stirred for 3 hours and reacted, and added with 3 M NaCl to stop the reaction and induce the aggregation of the mEBP-SBP di-block. The aggregated mEBP-SBP was dissolved in 5% acetic acid together with 8 M urea and purified with ITC to remove free FITC. Self-assembled nanostructures were prepared by dialysis of the FITC-labeled mEBP-SBP di-block in a phosphate buffer (10 mM, 5.0 pH) for 1 day. The swollen state of the self-assembled nanostructure of the EBP-SBP di-block was confirmed by confocal laser scanning microscopy (CLSM) in brightfield and fluorescence modes. In order to check the surface adhesion of the mEBP-SBP di-block, after dialysis, the mEBP-SBP di-block was dropped on a slide glass, cultured for 1 hour at room temperature, and then the glass surface with the sample solution was washed 3 times with a phosphate buffer (10 mM, pH 5.0).

Figure 7:
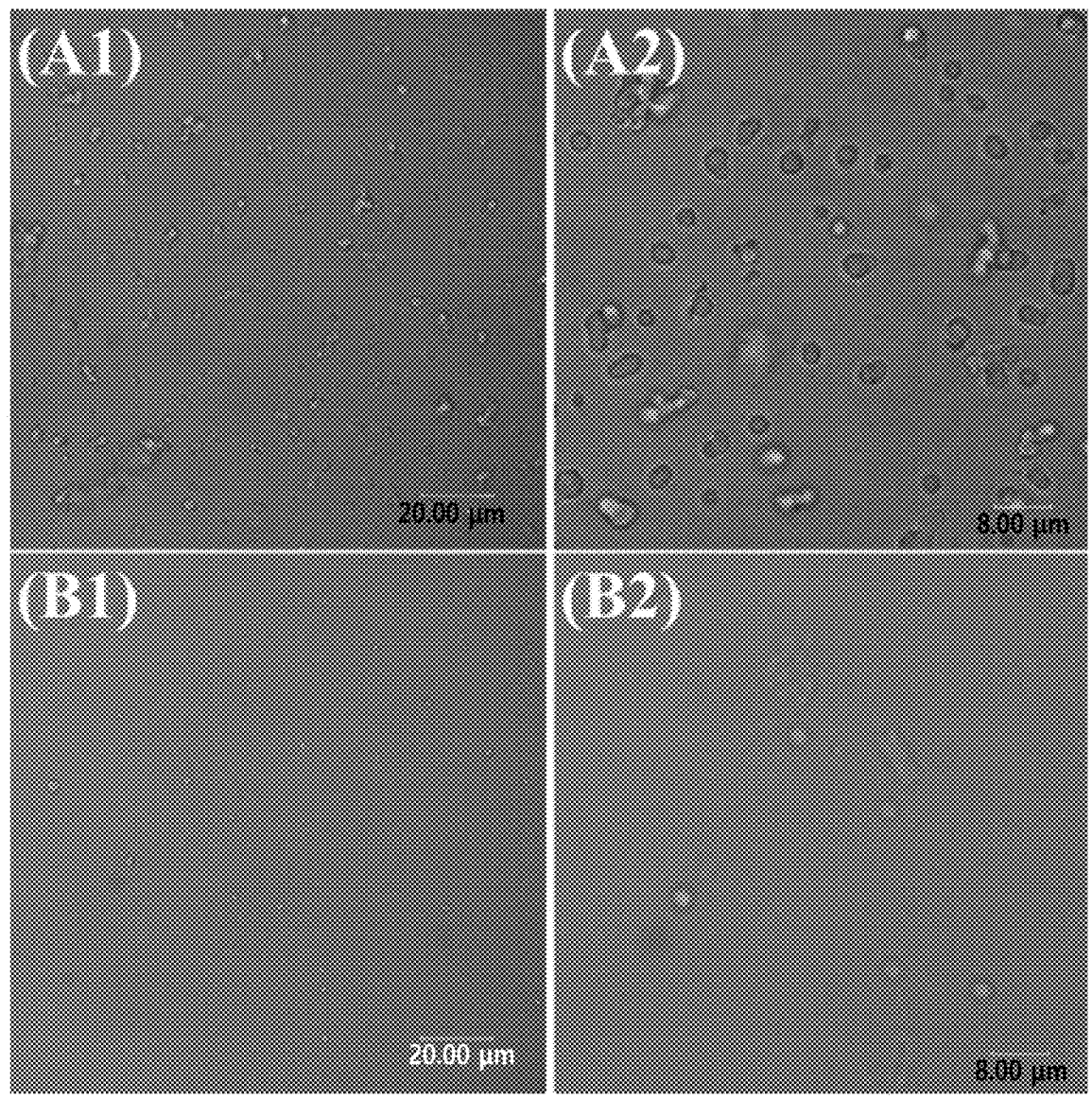
FIG. 7 is a bright field image of a self-assembled nanostructure of hydroxylated mE6S3 in a phosphate buffer (10 mM, pH 5.0) at room temperature. The surface adhesion may be confirmed in images before washing (A1 and A2) and after washing (B1 and B2), and 1 and 2 were imaged at different magnifications, and the scale bars were 20 m in (A1) and (B1) and 8 μm in (A2) and (B2).

As can be seen from brightfield images using CLSM (FIGS. 7(A1) and 7(A2)), the β-sheet of the SBP block was formed and mE6Sn hydroxylated with the hydrated EBP block in the swollen state was self-assembled to form a self-assembly of a vesicular structure, and the mE6S3 formed a vesicular structure with an average size of 1.02±0.21 mm in the swollen state. Also, as can be seen in FIGS. 7(B1) and 7(B2), the self-assembled nanostructure of mE6S3 was attached to the slide glass even after washed with a phosphate buffer, and thus, it could be seen that the surface adhesion was increased by a DOPA residue of the EBP block in mE6S3.

Figure 8:
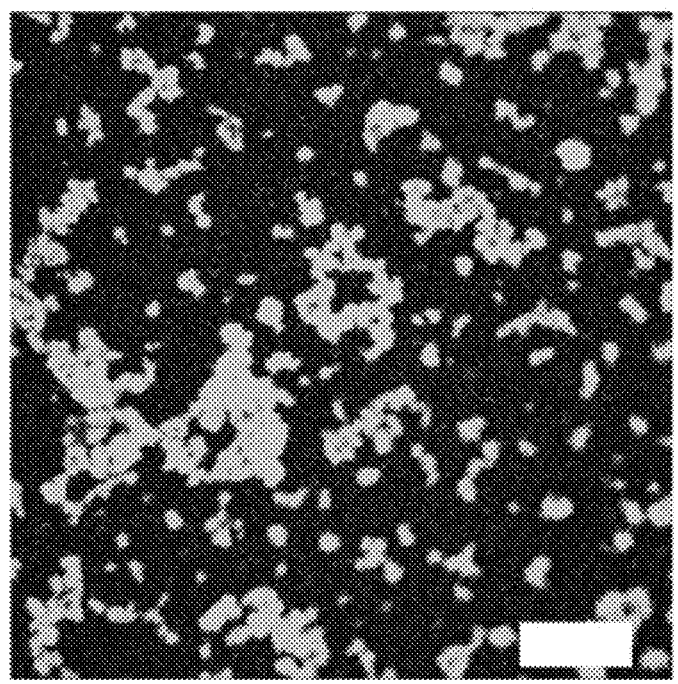
FIG. 8 is a fluorescent image of mE6S3 in a phosphate buffer (10 mM, pH 5.0) at room temperature. The surface adhesion of FITC-labeled hydroxylated mE6S3 is confirmed before washing (A) and after washing (B), and the scale bar is 8 μm in (A) and (B).
Figure 8:
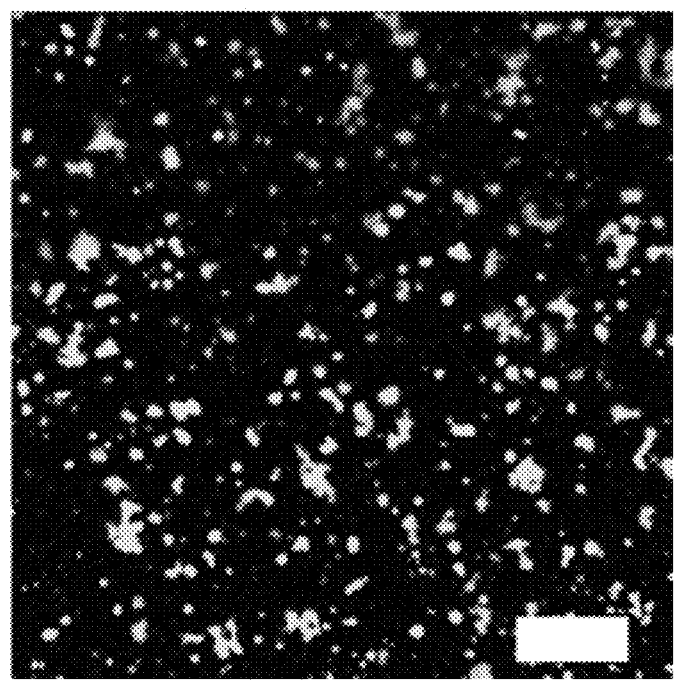
Figure 9A:
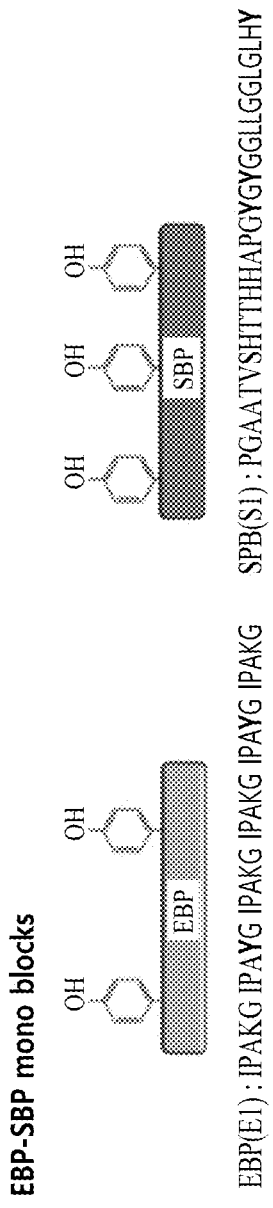
FIG. 9A is a schematic diagram of an amino acid sequence of EBP and SBP mono blocks, IPAYG IPAKG IPAYG IPAKG IPAYG IPAKG is SEQ ID NO:5 and PGAATVSHTTHHAPGYGYGGLLGGLGLHY is SEQ ID NO:15.
Figure 9B:
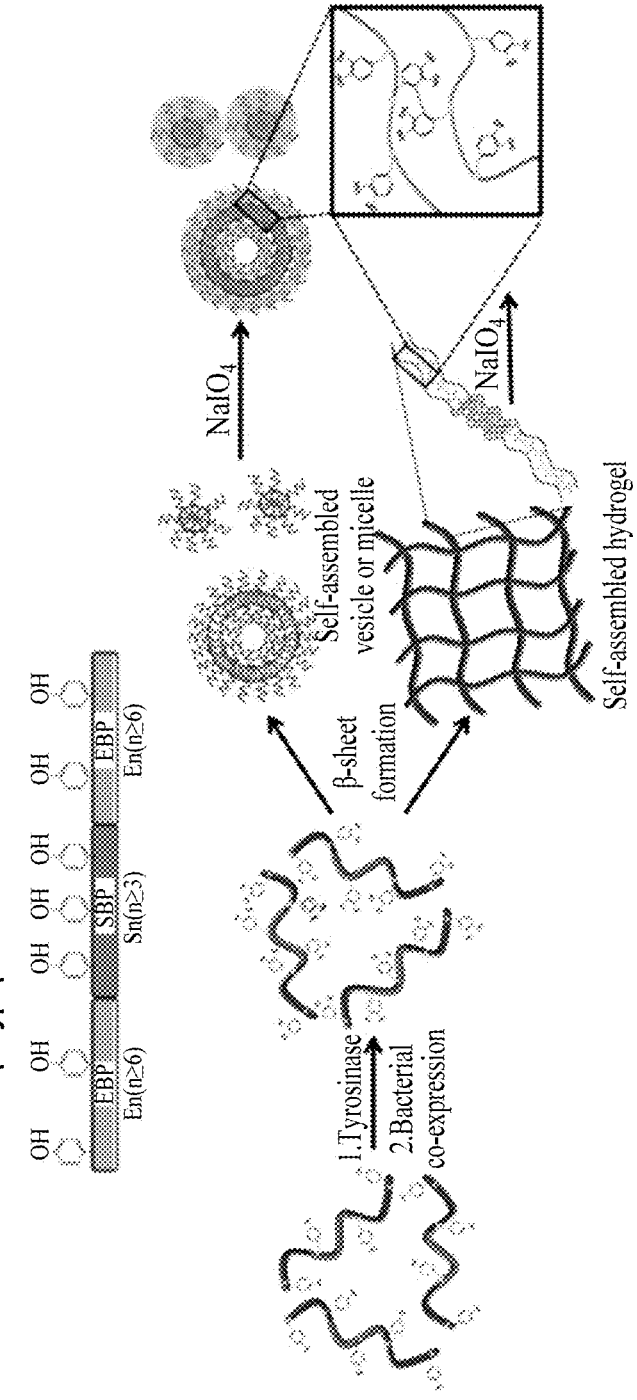
FIG. 9B is a schematic diagram of a structure of an ABA type tri-block copolypeptide and preparation and a structure of self-assembled structure and hydrogel of the tri-block copolypeptide modified into DOPA.
Figure 9C:
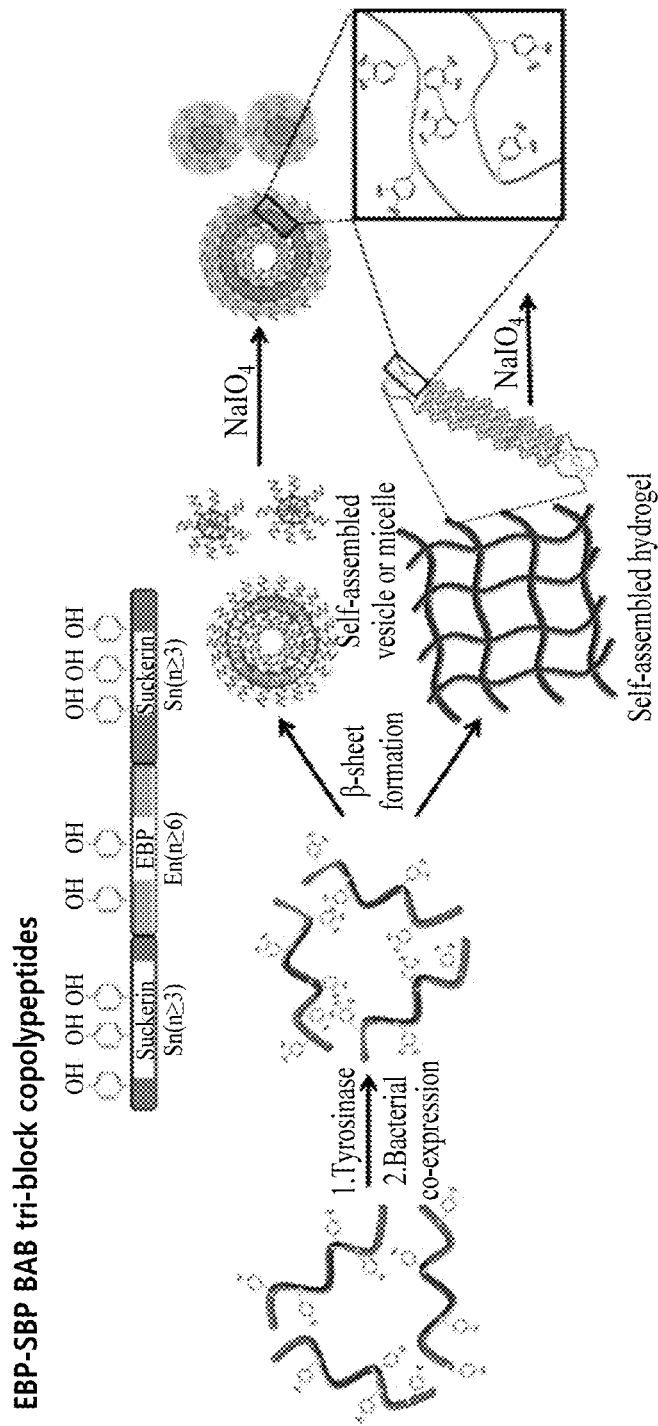
FIG. 9C is a schematic diagram of a structure of a BAB type tri-block copolypeptide and preparation and a structure of self-assembled structure and hydrogel of the tri-block copolypeptide modified into DOPA. In the two types of tri-block copolypeptides (ABA type and BAB type), the B block refers to a hydrophilic EBP block and the A block refers to an amphiphilic SBP block. A tyrosine residue of the EBP-SBP tri-block copolypeptide is hydroxylated using mushroom tyrosinase or a bacterial co-expression system to form a DOPA moiety with adhesion properties. The modified EBP-SBP tri-block copolypeptide (mEBP-SBP tri-block) is self-assembled into a nanostructure under diluted conditions or self-assembled into a hydrogel by chemical cross-linking of the EBP block by DOPA oxidized by $NaIO_4$ treatment and β-sheet formation of the SBP block. Furthermore, the oxidation of the DOPA under concentrated conditions improves the mechanical properties of the self-assembled hydrogel by chemical cross-linking.

The fluorescence images of FITC-labeled mE6S3 were shown in FIG. 8. FITC was labeled with mE6S3 by conjugating FITC of a molar ratio of 1:1 and the lysine residue of the adhesive EBP block, and as can be seen in FIG. 8(A), the average diameter of the chemically FITC-labeled mE6S3 nanostructure in the swollen state was 0.84±0.13 mm, and as can be seen in FIG. 8(B), the nanostructure remained on the surface of a slide glass even after washed with a phosphate buffer having strong adhesion. It can be seen that this is caused by the adhesive EBP block exposed to the nanostructure shell.

Example 6. Preparation of EBP-SBP Tri-Block Gene Structure

Figure 10A:
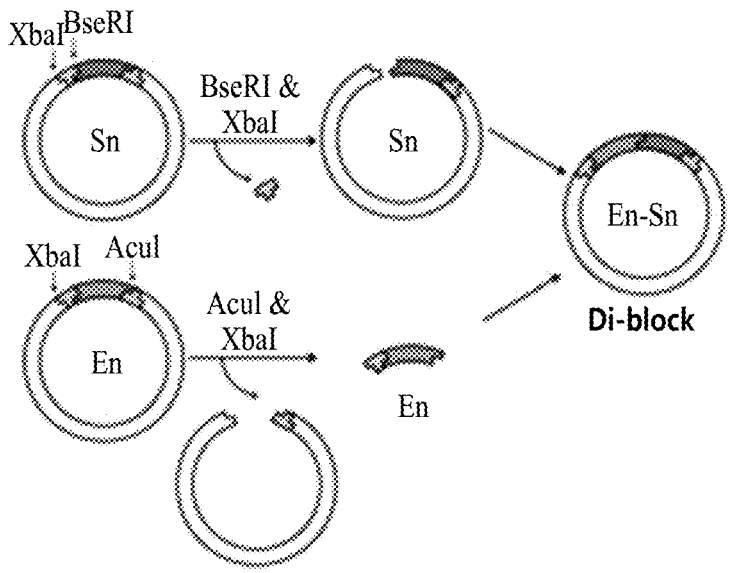
FIG. 10A is a schematic diagram of a synthesis method of an ABA type tri-block, SnEmSn.
Figure 10A:
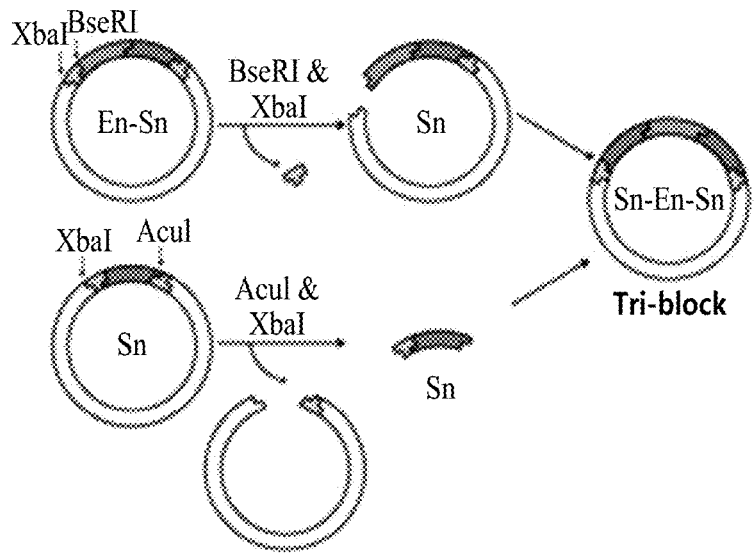
Figure 10B:
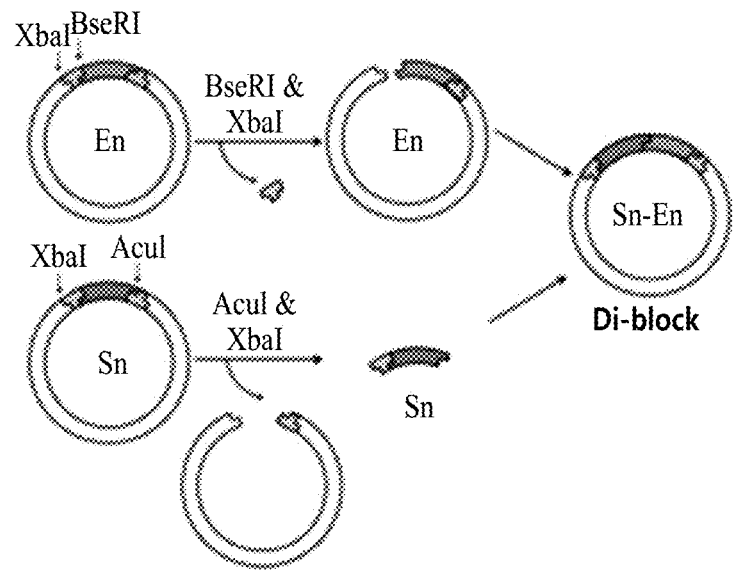
FIG. 10B is a schematic diagram of a synthesis method of a BAB type tri-block, EmSnEm.
Figure 10B:
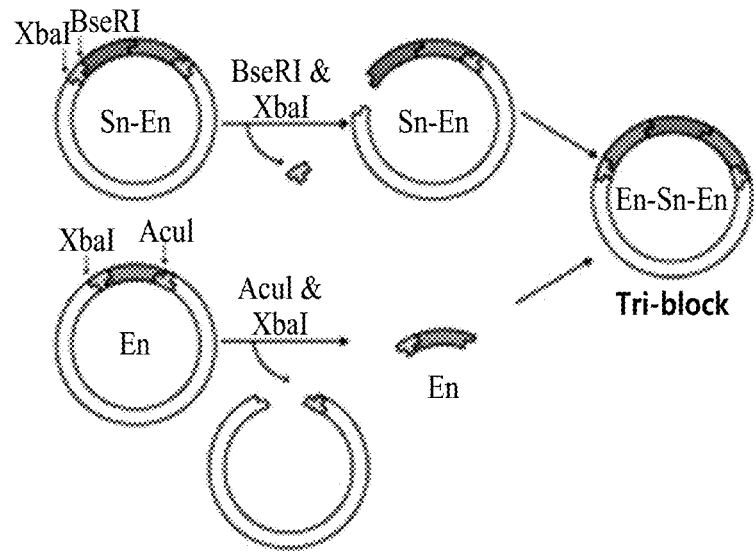

Two types of EBP-SBP tri-block genes, ABA and BAB, were synthesized by recursive directional ligation (RDL). In each case, in the tri-block genes SnEnSn and EnSnEn, the EBP-SBP di-block gene was first synthesized by methods of FIGS. 10A and 10B, and then the EBP-SBP tri-block gene was prepared.

Specifically, in the ABA-type tri-block synthesis, a plasmid containing an En gene was cleaved with XbaI and AcuI, and an Sn gene linearized by XbaI and BseRI was inserted into the encoded plasmid to form a plasmid containing an EnSn di-block gene. In addition, a plasmid containing the Sn gene cleaved with XbaI and AcuI was inserted into the EnSn di-block gene linearized by XbaI and BseRI to prepare a plasmid containing an SnEnSn tri-block gene. Similarly, even in the BAB tri-block synthesis, the Sn gene was inserted into the plasmid containing the En gene, and then the En gene was inserted into the plasmid containing the SnEn gene to prepare an EnSnEn tri-block gene. Similarly to the EBP-SBP di-block, S3E6S3, S6E6S6, E6S3E6 and E6S12E6 were prepared to confirm changes in properties of the nanostructures according to the length of the SBP and EBP blocks.

The size of each gene was confirmed through DNA agarose gel electrophoresis and DNA sequencing after cleavage with XbaI and BamHI. The electrophoresis results were shown in FIGS. 10C and 10E. The lengths of the S3E6S3, S6E6S6, E6S3E6, and E6S12E6 genes were 1128, 1650, 1407, and 2190 bp, respectively, including an adapter sequence (66 bp). A DNA standard marker size in bp unit was indicated on the left sides of FIGS. 10C and 10E, and the expected size of each block gene was indicated on the right side. Table 6 below shows the gene lengths of the tri-block copolypeptides and the expected molecular weights of the EBP-SBP tri-blocks.

TABLE 6

| Tri-block copolypeptides | Nucleotide chain length (bp) | M.W (kDa) |
|---|---|---|
| S3E6S3 | 1128 | 34.79 |
| S6E6S6 | 1650 | 52.15 |
| E6S3E6 | 1407 | 43.32 |
| E6S12E6 | 2190 | 69.39 |

Example 7. Expression and Purification EBP-SBP Tri-Blocks and Hydroxylation of Tyrosine Residue in EBP-SBP Tri-Blocks A plasmid for EBP-SBP tri-block expression was transformed into *E. Coli* BL21 (DE3) cells, the expression induction and purification of the tri-block were performed in the same manner as in Example 2, and the purity and molecular weight of the EBP-SBP tri-block copolypeptide were confirmed by staining with a 0.3 M copper chloride solution and performing SDS-PAGE.

All tri-block copolypeptides were successfully purified by ITC 3 to 4 times, and the yield of the purified blocks was >170 mg per liter of culture.

Figures 10C, 10D:
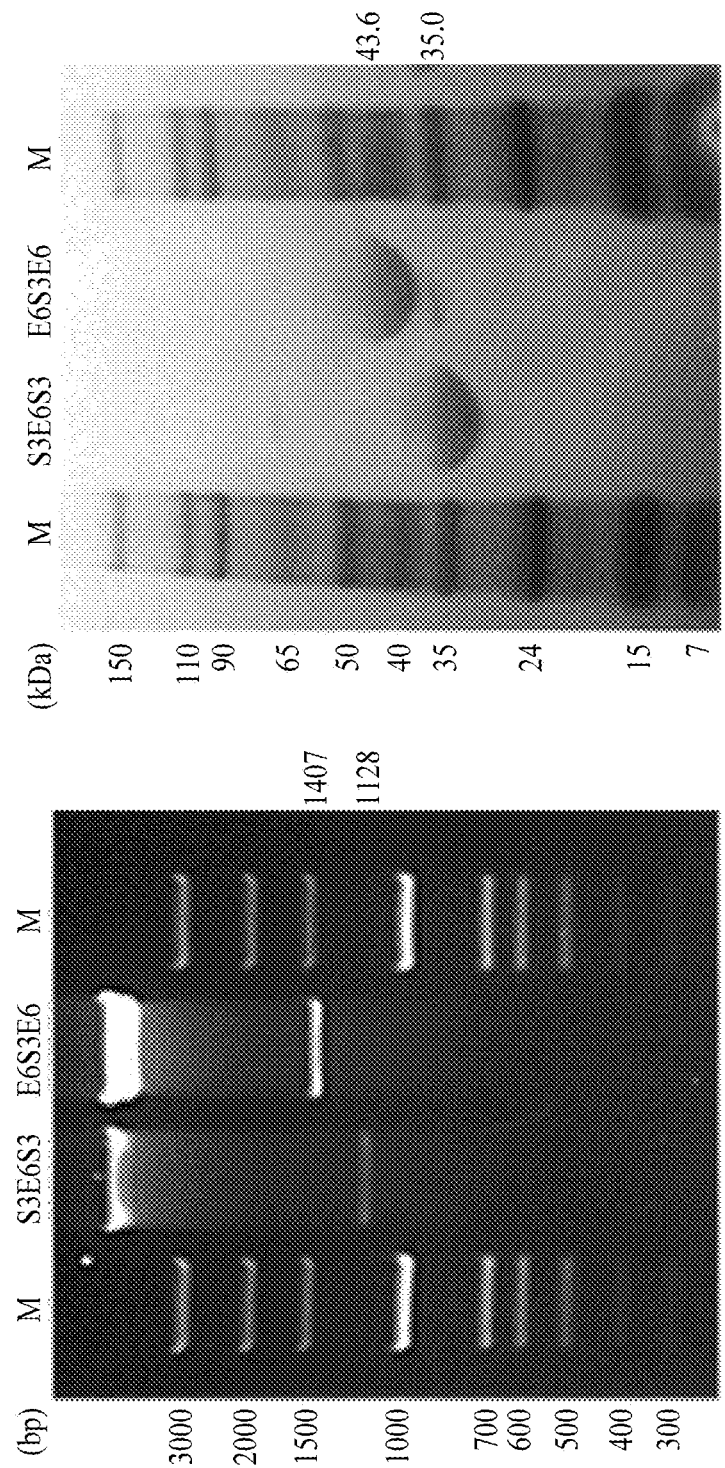
FIG. 10C is an agarose gel image obtained by electrophoresis after cleaving S3E6S3 and E6S3E6 genes with XbaI and BamHI.
FIG. 10D is a copper-stained SDS-PAGE image of purified S3E6S3 and E6S3E6.
Figures 10E, 10F:
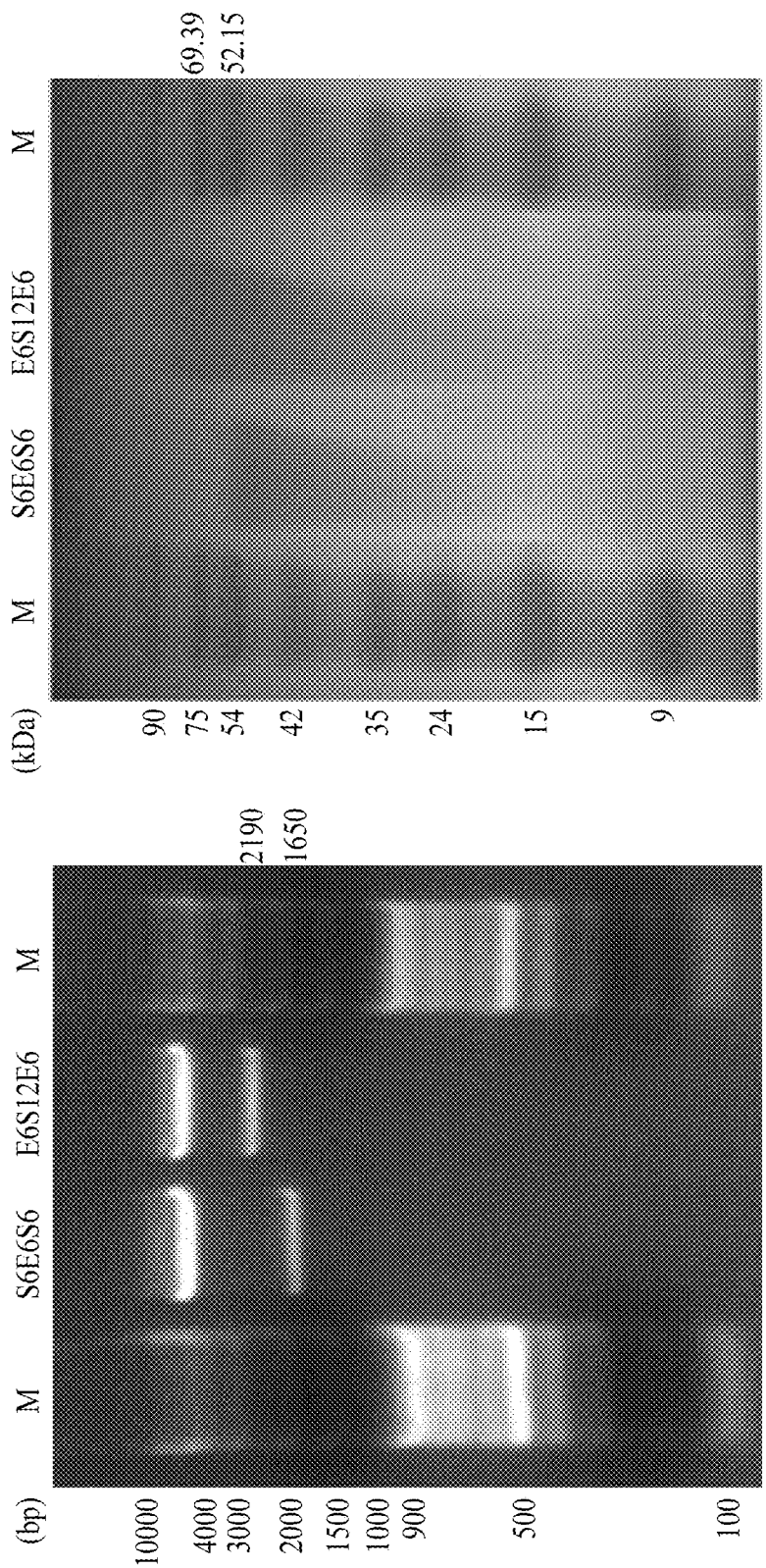
FIG. 10E is an agarose gel image obtained by electrophoresis after cleaving S6E6S6 and E6S12E6 genes with XbaI and BamHI.
FIG. 10F is a copper-stained SDS-PAGE image of purified S6E6S6 and E6S12E6. The sizes of a standard marker is indicated on the left sides of FIGS. 10C to 10F, and the expected size is indicated on the right side.

Copper-stained SDS-PAGE gel images of S3E6S3, S6E6S6, E6S3E6, and E6S12E6 were shown in FIGS. 10D and 10F, and in each SDS-PAGE gel image, the MW of the protein standard size marker was indicated on the left, and the expected molecular weight of each block was indicated on the right. All the tri-blocks exhibited mobile phases consistent with the expected molecular weight (MW).

In addition, the tyrosine residue in the EBP-SBP tri-block purified in the same manner as in Example 3 was hydroxylated using mushroom tyrosinase or a bacterial co-expression system to be modified into DOPA, and confirmed by performing SDS-PAGE and NBT/Glycinate staining. The EBP-SBP tri-block modified into DOPA using the bacterial co-expression system was obtained by culturing BL21(DE3) cells containing a pET21a(+) vector for EBP-SBP tri-block expression or a pACYC duet vector for tyrosinase expression containing orf438 in the same medium.

The mEBP-SBP tri-block copolypeptide is called mSnEnSn or mEnSnEn.

Figure 11:
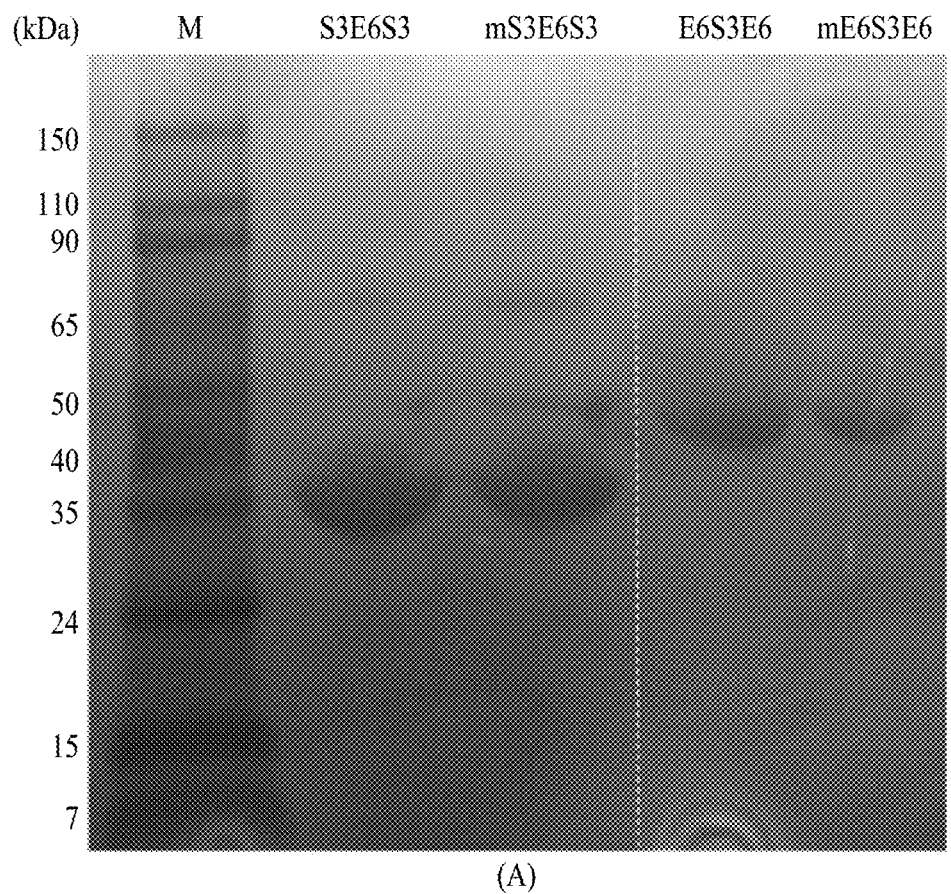
FIG. 11(A) illustrates copper-stained SDS-PAGE images of S3E6S3 and E6S3E6 and mS3E6S3 and mE6S3E6 in which a tyrosine residue of the tri-block copolypeptide is hydroxylated by mushroom tyrosinase.
FIG. 11(B) is a result of confirming that the tyrosine residue of the tri-block is modified into DOPA through NBT/glycinate staining.
Figure 11:
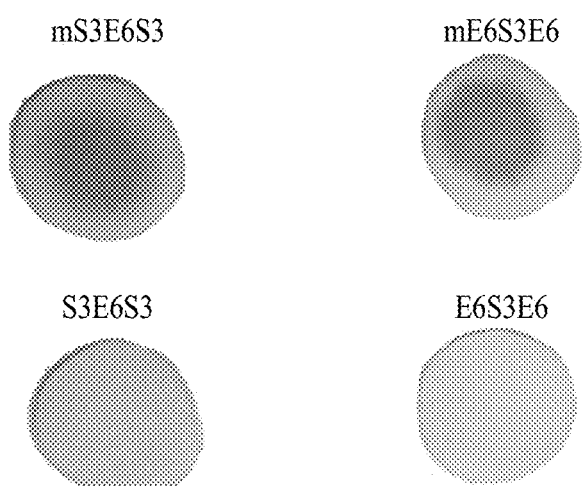

As can be seen in FIG. 11(A), the DOPA-modified EBP block was known to migrate with a higher molecular weight than before modification, whereas the S3E6S3 and E6S3E6 tri-blocks showed similar moving phases both before and after DOPA modification. This difference is expected depending on a molecular weight as observed for the EBP-SBP di-block. Modification into DOPA was specifically confirmed by the results of NBT/Glycinate staining using redox cycling. In FIG. 11(B), it can be seen that mS3E6S3 and mE6S3E6 were stained in purple, and S3E6S3 and E6S3E6 were stained in yellow.

Example 8. Confirmation of Characteristics of EBP-SBP Tri-Block Copolypeptides

In the same manner as in Example 4, the phase transition thermal characteristics and hydrodynamic radii of EBP-SBP tri-block copolypeptides were measured, and structural characteristics were confirmed through TEM and SEM imaging.

Figure 12:
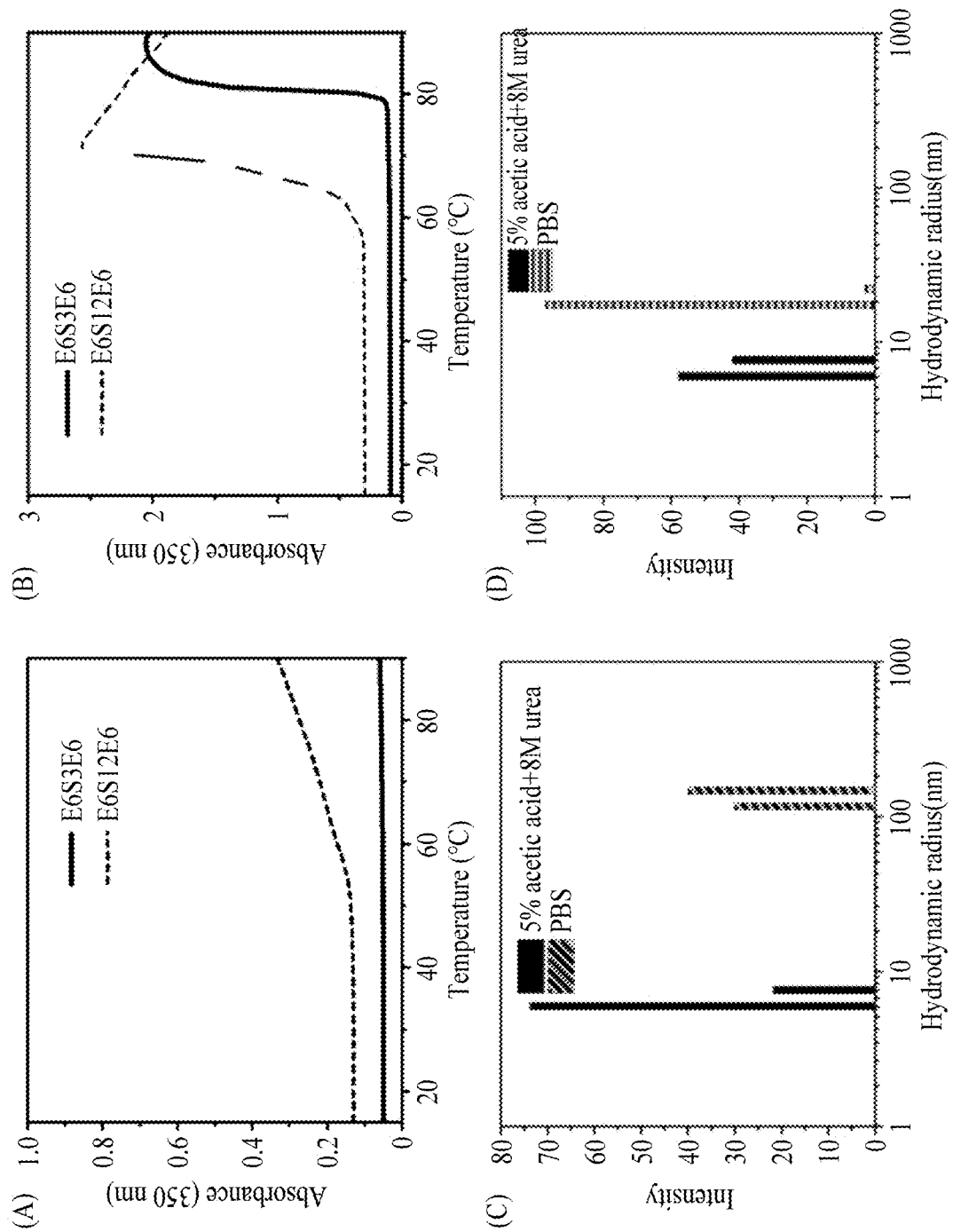
FIG. 12 is a heat-dependent absorbance profile of an EBP-SBP tri-block copolypeptide in (A) 10 mM PBS or (B) 10 mM PBS containing 0.1 M sodium chloride as a temperature function. In addition, size distribution analysis results of (C) E6S3E6 and (D) E6S12E6 are obtained in dialysis at room temperature of (1) 5% acetic acid and 8 M urea for forming a soluble monomer or (2) 10 mM PBS for forming a self-assembled nanostructure.

The thermal characteristics of E6SnE6 were shown in FIGS. 12(A) and 12(B), and as can be seen in FIG. 12(A), the LCST of E6S3E6 was 90° C. or higher, and the LCST of E6S12E6 was 55° C. To characterize the LCST of E6S3E6, the LCST was reduced using PBS supplemented with 0.5 M NaCl. FIG. 12(B) shows that the LCST of E6S3E6 in PBS supplemented with 0.5 M NaCl was 80° C. LCST induced by disruption of hydrophilic EBP end blocks decreased as the length of a hydrophobic SBP block increased.

The self-assembly of E6S3E6 and E6S12E6 through β-sheet formation was characterized by DLS measurement at room temperature as illustrated in FIGS. 12(C) and 12(D). The hydrodynamic radii $R_h$ of the E6S3E6 and E6S12E6 nanostructures were confirmed as 6.34±0.32 nm and 7.20±0.84 nm in 5% acetic acid supplemented with 8 M urea, respectively, as indicated by black bars. On the other hand, when dialyzed against PBS (10 mM, pH 7.4), self-assembled nanostructures with average $R_h$ of 125.45±15.26 and 17.65±1.78 nm were clearly shown through β-sheet formation of SBP intermediate blocks of E6S3E6 and E6S12E6, which were indicated by red bars in the drawings. From the above results, it could be seen that the size of the E6SnE6 nanostructure decreased as the length of the SBP block increased, and it was suggested that when the SBP length increased, the β-sheet formation of SBP blocks was potentially increased through intramolecular and intermolecular interactions.

Figure 13:
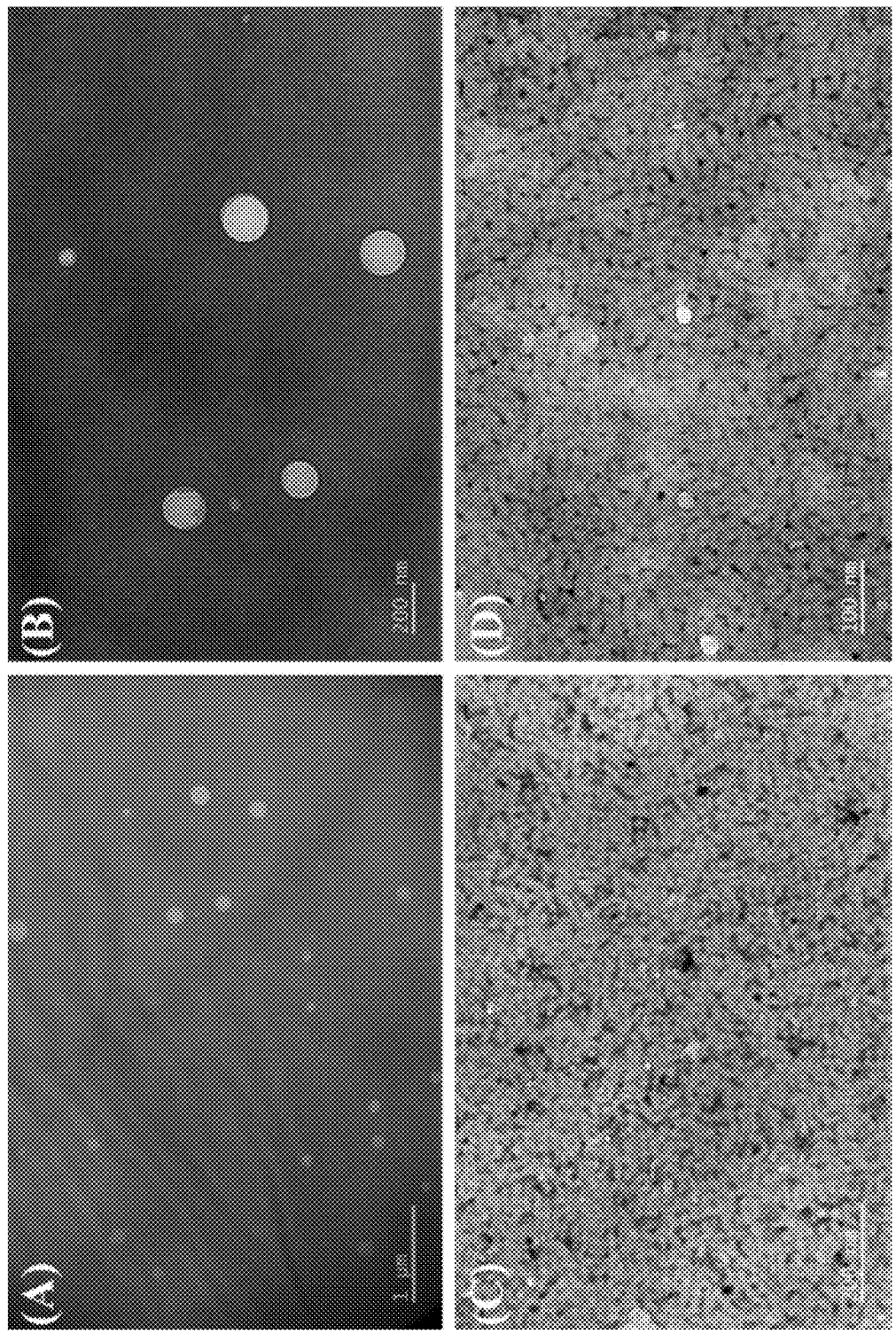
FIGS. 13(A) and 13(B) are TEM images of E6S3E6 dried at room temperature after staining with 2% PTA.
FIGS. 13(C) and 13(D) are TEM images of E6S12E6. Scale bars are 1 μm (A), 200 nm (B, C), and 100 nm (D), respectively.

TEM images were performed to characterize the nanostructures observed by DLS. As confirmed by the TEM images in FIGS. 13(A) and 13(B), the average size of the E6S3E6 self-assembled nanostructure was 190.26±50.68 nm, and it was confirmed that there were nanoparticles of a vesicular structure with a layer stained with PTA. In contrast, the average diameter of the self-assembled nanostructure of E6S12E6 was 15.38±2.68 nm, which was confirmed as a micellar nanostructure (FIGS. 13(C) and 13(D)). From the above, it can be seen that the nanostructures exhibit different physical characteristics due to a difference in critical packing density as the length of the SBP block increased.

Example 9. Confirmation of Surface Adhesion of Hydroxylated mEBP-SBP Tri-Block Nanostructures To visualize the adhesion of a mEBP-SBP tri-block, a lysine residue of an EBP block was labeled with FITC. The mEBP-SBP tri-block was dissolved in a sodium bicarbonate buffer containing 8 M urea, and FITC dissolved in dimethyl sulfoxide was added dropwise to a solution at a molar ratio of 1:1. The reaction mixture was stirred for 3 hours and reacted, and added with 3 M NaCl to stop the reaction and induce the aggregation of the mEBP-SBP tri-block. The aggregated mEBP-SBP tri-blocks were dissolved in 5% acetic acid together with 8 M urea and purified with ITC to remove non-reacted FITC. Self-assembled nanostructures were prepared by dialysis of the FITC-labeled mEBP-SBP tri-block in PBS (10 mM, 7.4 pH) for 1 day. The swollen state of the self-assembled nanostructure of the mEBP-SBP tri-block was confirmed by confocal laser scanning microscopy (CLSM) in a fluorescence mode. In order to check the surface adhesion of the mEBP-SBP tri-block, after dialysis, the dialyzed mEBP-SBP tri-block solution was dropped on a slide glass, cultured for 1 hour at room temperature, and then the glass surface with the sample solution was washed 3 times with PBS (10 mM, pH 7.4).

Figure 14:
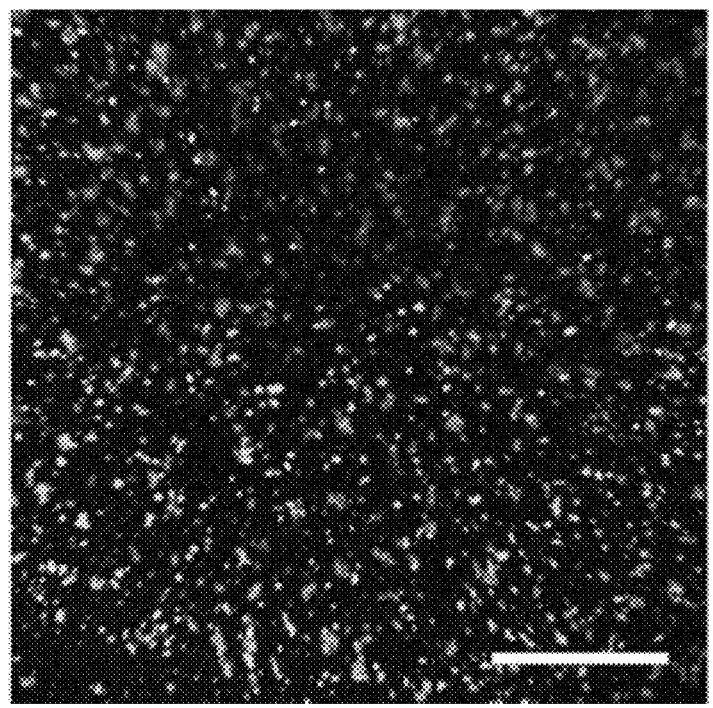
FIG. 14 is a fluorescent image of hydroxylated mE6S3E6 in PBS (10 mM, pH 7.4) at room temperature. The surface adhesion of FITC-labeled mE6S3E6 is confirmed before washing (A) and after washing (B), and the scale bar is 20 μm in (A) and (B).
Figure 14:
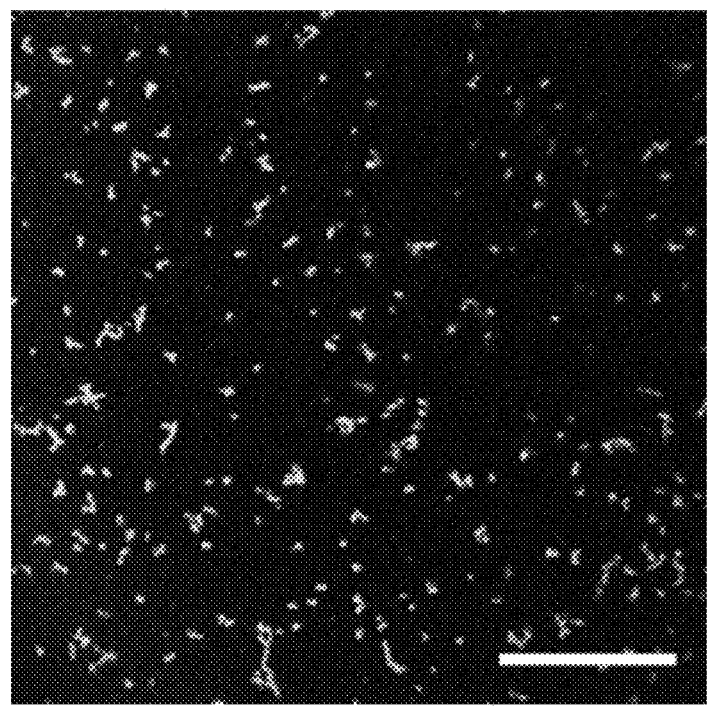

As can be seen from fluorescent images using CLSM (FIG. 14(A)), the β-sheet of the SBP block was formed and mE6S3E6 as the hydrated EBP block in the swollen state was self-assembled to form a self-assembly of a vesicular structure, and the mE6S3E6 formed a vesicular structure with an average size of 0.83±0.23 mm in the swollen state. Also, as can be seen in FIG. 14(B), the self-assembled nanostructure of mE6S3E6 was attached to the slide glass even after washed with PBS, and thus, it could be seen that the adhesion was formed by a DOPA residue of the EBP block in mE6S3E6.

Example 10. Confirmation of Surface Adhesion of Hydroxylated mEBP-SBP Tri-Block Nanostructures in Bulk Scale A dynamic frequency sweep test was performed within a linear viscoelasticity region at 4° C. in each frequency range of 0.1 to 10 rad/sec, and the rheological behavior of chemical cross-linking was characterized by a time-dependent rheology method. To measure cross-linking kinetics in PBS (10 mM, pH 7.4), a 5 mM $NaIO_4$ solution was uniformly mixed with 30 wt % of the mEBP-SBP tri-block at 4° C., and the mixed solution was transferred to a Peltier plate equilibrated at a fixed temperature. Changes in elastic modulus and loss modulus corresponding to gel formation were monitored in an oscillatory mode using a 40 mm cone plate with 58 mm spacing. An elastic modulus (G') and a loss modulus (G") of mS3E6S3 and mE6S3E6 were measured at constant strain and frequency after $NaIO_4$ was added for oxidation during gelation.

Figure 15:
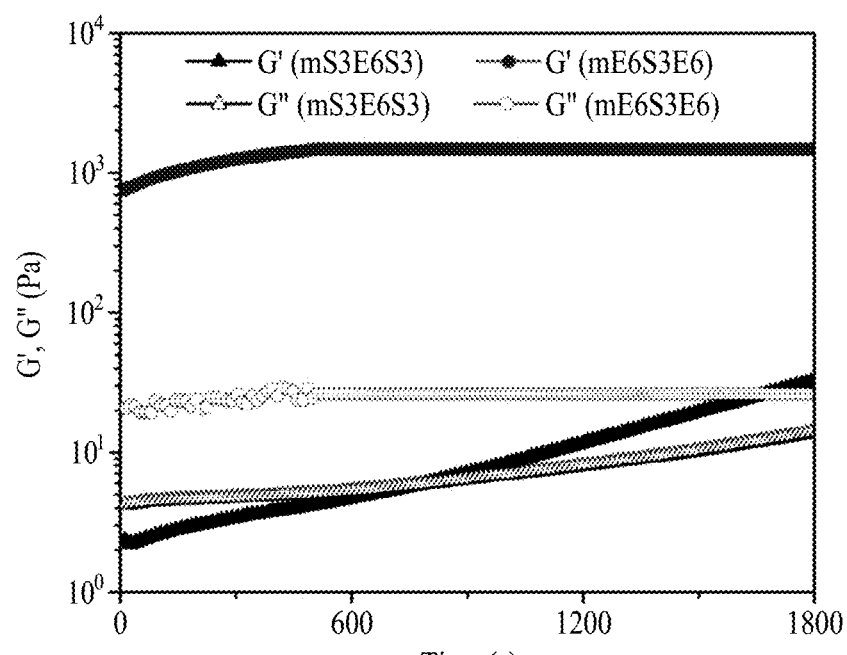
FIG. 15(A) is a time sweep test analysis result of hydroxylated mS3E6S3 and mE6S3E6 in the presence of 5 mM $NaIO_4$ at 4° C. (frequency 1 rad/sec, strain 0.2%).
FIG. 15(B) is a bulk adhesive strength test result of mS3E6S3 and mE6S3E6 as a function of $NaIO_4$ concentration under humid conditions at room temperature, in which all samples were dissolved in a phosphate buffer (10 mM, pH 5.0).
Figure 15:
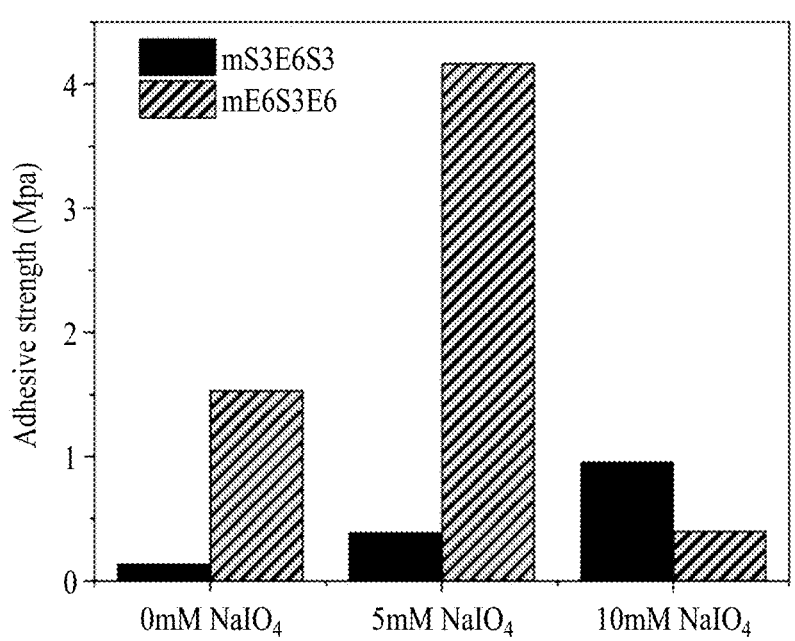

As can be seen in FIG. 15(A), the gelation time of mS3E6S3 using 5 mM $NaIO_4$ was less than 15 minutes at 4° C. (frequency 1 rad/sec, strain 0.2%). On the other hand, mE6S3E6 exhibited a higher G' than G", and is instantaneously chemically and physically cross-linked by the β-sheet formation of the SBP block and oxidation of the $NaIO_4$ induction.

Subsequently, a lap shear test was performed to measure the bulk adhesive strength of the mEBP-SBP tri-block copolypeptide. Specifically, an aluminum fixture was selected as an adherend of the mEBP-SBP tri-block, and the adhesive surface was immersed and rinsed in acetone, ethanol and deionized water for 15 minutes, respectively, and dried for reuse. The mEBP-SBP tri-block was dissolved in 10 mM PBS at 30 wt %, and each solution was placed directly on an aluminum adherend and mixed with various concentrations of $NaIO_4$. The adherend was covered with another adherend to form an overlapping area of 10 mm×10 mm, and 60 g of weight was added, cured in room temperature air for 30 minutes, and then immersed and washed in PBS at 25° C. Each sample was subjected to a lap shear test using a universal tester (INSTON 3365; Norwood, MA) at a cross-head speed of 5 mm/min and under normal conditions. The wet adhesive strength of the mEBP-SBP tri-block was calculated from the measured maximum value of a distance to force plot just before breakage.

FIG. 15(B) shows the adhesive strength of mS3E6S3 and mE6S3E6 according to a concentration of $NaIO_4$ as a chemical cross-linking agent, and shows a relationship between a degree of cross-linking and bulk adhesive strength in each hydrogel. DOPA imparts the surface adhesion through hydrogen bonds and coordinate bonds with the aluminum surface, whereas DOPA in the oxidized form of quinone is known to induce intramolecular and intermolecular cross-linking for cohesion. Both mS3E6S3 and mE6S3E6 hydrogels were expected to increase cohesion rather than adhesion by chemical cross-linking of $NaIO_4$, but the bulk adhesive strength of mS3E6S3 significantly increased from 0.10 MPa to 0.96 MPa as the concentration of $NaIO_4$ increased in the 0 to 10 mM range, which is suggested that intramolecular and intermolecular cross-linking induced by quinines in the oxidized form of DOPA was increased. Similarly, the bulk adhesive strength of mE6S3E6 also significantly increased from 1.04 MPa to 4.17 MPa as the treatment concentration of $NaIO_4$ increased.

Figure 16A:
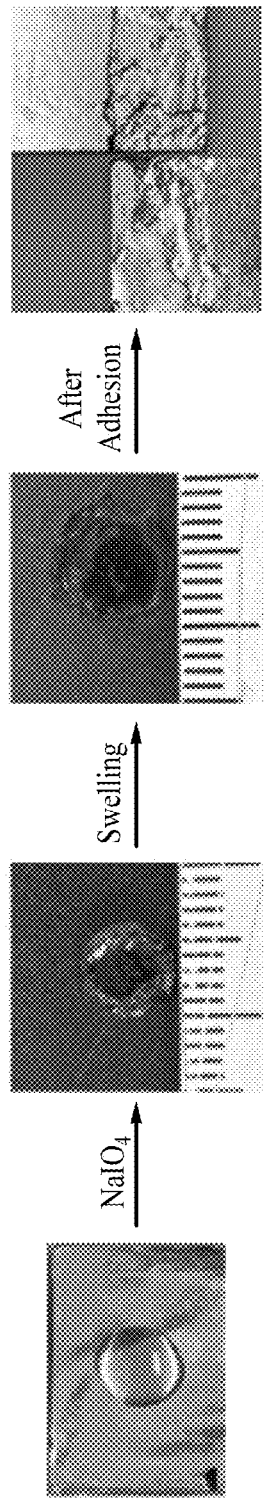
FIG. 16A is a photograph of a hydroxylated mE6S3E6 hydrogel and an adhesive surface after adhesion failure of the gel.

FIG. 16A is a photograph of loading an mEBP-SBP tri-block solution dissolved in 10 mM PBS on an aluminum plate to control the bulk adhesive strength, and a self-assembled mEBP-SBP tri-block hydrogel treated with $NaIO_4$ was loaded onto the adherend. Each adherend has a brown color on the surface, which indicates breaking the hydrogel leading to its adhesion failure while the hydrogel adheres to the surface.

Figure 16B:
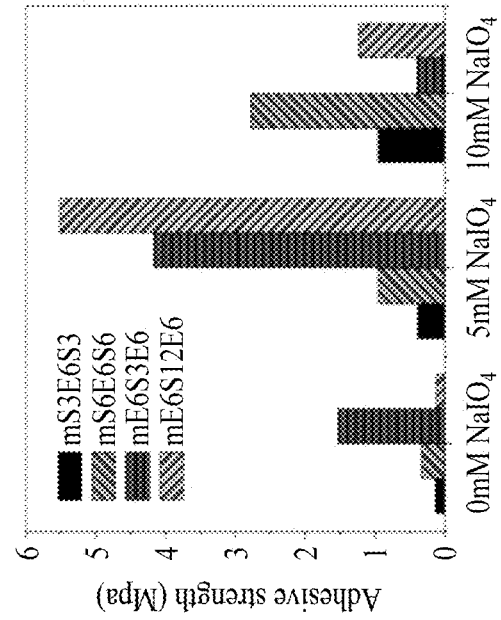
FIG. 16B is a bulk adhesion strength test result of the formed hydrogel as mE6S3E6 concentration and $NaIO_4$ concentration functions.
Figure 16C:
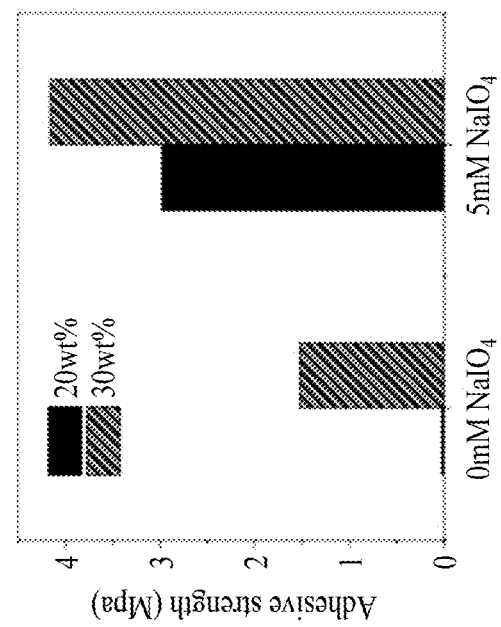
FIG. 16C is a bulk adhesive strength test result of an mEBP-SBP-EBP tri-block hydrogel according to a $NaIO_4$ concentration under wet conditions.

As can be seen in FIGS. 16B and 16C, the adhesive strength test results of the mEBP-SBP tri-block hydrogel show that an increase in concentration of the mEBP-SBP tri-block significantly enhanced the adhesive property. This is shown to be caused by the increased concentration of the DOPA residue and chemical cross-linking of DOPA through $NaIO_4$ oxidation.

Thereafter, a loading test of the mEBP-SBP tri-block copolypeptide was performed using a glass surface as an adhesive. The mEBP-SBP tri-block copolypeptide solution was dropped onto a glass surface and attached to counter glass with different weights in the range of 0.5 kg to 4.0 kg. To test a load bearing capacity, images of lifting the glass with the mEBP-SBP tri-block copolypeptide hydrogel were photographed.

Figure 16D:
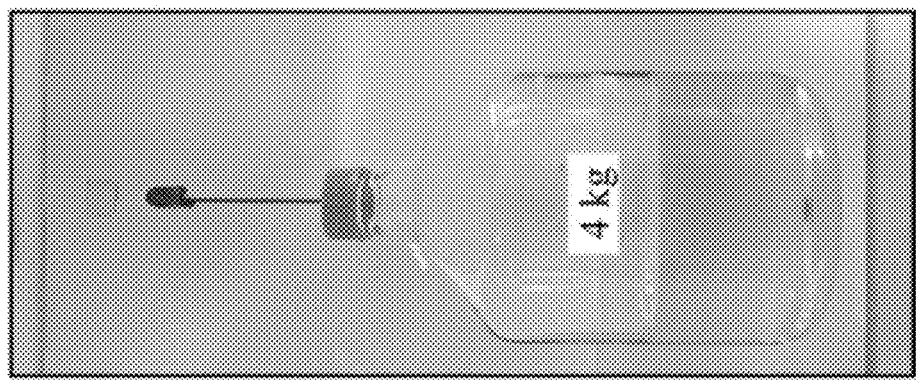
FIG. 16D confirms the strong adhesion properties of an mE6S12E6 hydrogel treated with 5 mM $NaIO_4$ to glass, and may support a load of 0.5 to 4 kg. All samples were dissolved in PBS (10 mM, pH 7.4).
Figure 16D:
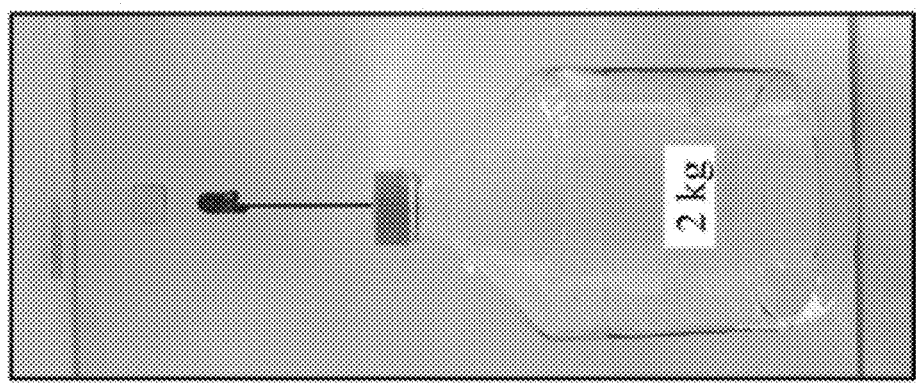
Figure 16D:
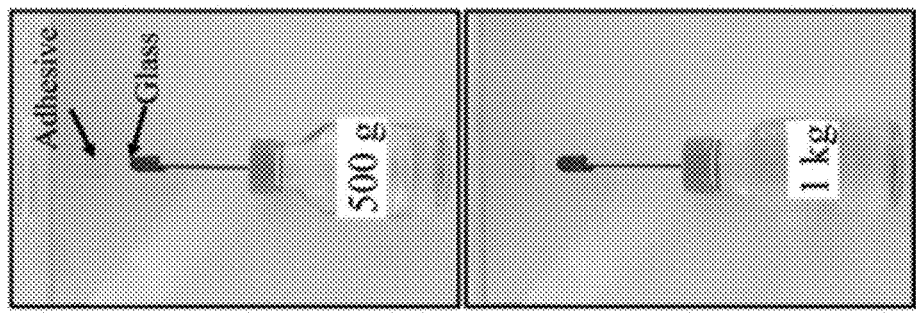

As can be seen in FIG. 16D, an mEBP-SBP tri-block hydrogel having an optimized block length showed controlled adhesion properties in the range of 0.5 to 6.0 MPa to exhibit a load bearing capacity of 0.5 kg to 4.0 kg. From the above, it is suggested that the β-sheet formation of the SBP block and the chemical cross-linking of DOPA through $NaIO_4$ oxidation improve the mechanical properties as well as the adhesive properties of the self-assembled hydrogel.

The multiblock copolypeptide of the present disclosure can be used as a drug carrier due to its temperature- and pH-dependent phase change properties and self-assembly properties, and can be used as an adhesive, particularly a bioadhesive, due to strong surface adhesion.

As described above, specific parts of the present disclosure have been described in detail, and it will be apparent to those skilled in the art that these specific techniques are merely preferred example embodiments, and the scope of the present disclosure is not limited thereto. Therefore, the substantial scope of the present disclosure will be defined by the appended claims and their equivalents.

The invention claimed is:

1. A multiblock copolypeptide comprising:
   a suckerin-based polypeptide (SBP); and
   an adhesive elastin-based polypeptide (EBP),
   wherein the EBP includes tyrosine (Y) and/or lysine (K), and wherein the SBP consists of an amino acid sequence of SEQ ID NO: 11.

2. The multiblock copolypeptide of claim 1, wherein the multiblock copolypeptide consists of any one arrangement selected from the group consisting of $(SPB)_n(EBP)_m$; $(EBP)_m(SBP)_n$; $(SBP)_n(EBP)_m(SBP)_n$; and $(EBP)_m(SBP)_n(EBP)_m$, wherein n and m are integers of 1 or more, n is a number of repetitions of the SBP, and m is a number of repetitions of the EBP.

3. The multiblock copolypeptide of claim 1, wherein the EBP consists of the amino acid sequence: Ile Pro Ala Xaa Gly Ile Pro Ala Xaa Gly Ile Pro Ala Xaa Gly Ile Pro Ala Xaa Gly Ile Pro Ala Xaa Gly Ile Pro Ala Xaa Gly (SEQ ID NO: 13); wherein
   each Xaa is selected from the group consisting of tyrosine (Y), lysine (K), isoleucine (I) and DOPA.

4. A gene encoding the multiblock copolypeptide of claim 1.

5. A method for preparing a multiblock copolypeptide comprising:
   (1) preparing a recombinant microorganism into which the gene of claim 4 is introduced,
   (2) expressing a multiblock copolypeptide by culturing the recombinant microorganism; and
   (3) dissolving the recombinant microorganism and purifying the multiblock copolypeptide through inverse transition cycling (ITC).

* * * * *

SEQUENCE LISTING

<160> NUMBER OF SEQ ID NOS: 15

<210> SEQ ID NO 1
<211> LENGTH: 90
<212> TYPE: DNA
<213> ORGANISM: Artificial Sequence
<220> FEATURE:
<223> OTHER INFORMATION: EBP[Y2K4] gene

<400> SEQUENCE: 1

```
atcccggcca aaggcattcc tgcatacggt atcccggcca aaggcatccc ggccaaaggc    60
attcctgcat acggtatccc ggccaaaggc                                     90
```

<210> SEQ ID NO 2
<211> LENGTH: 90
<212> TYPE: DNA
<213> ORGANISM: Artificial Sequence
<220> FEATURE:
<223> OTHER INFORMATION: EBP[Y3K3] gene

<400> SEQUENCE: 2

```
attcctgcat acggtatccc ggccaaaggc attcctgcat acggtatccc ggccaaaggc    60
attcctgcat acggtatccc ggccaaaggc                                     90
```

<210> SEQ ID NO 3
<211> LENGTH: 90
<212> TYPE: DNA
<213> ORGANISM: Artificial Sequence
<220> FEATURE:
<223> OTHER INFORMATION: EBP[Y2K2I2] gene

<400> SEQUENCE: 3

```
attccggcct acggcatccc ggcaaaaggc attcctgcaa ttggcattcc ggcctacggc    60
atcccggcaa aaggcattcc tgcaattggc                                     90
```

<210> SEQ ID NO 4
<211> LENGTH: 90
<212> TYPE: DNA
<213> ORGANISM: Artificial Sequence
<220> FEATURE:
<223> OTHER INFORMATION: EBP[Y4K2] gene

<400> SEQUENCE: 4

```
attccggcct acggcatccc ggcaaaaggc attccggcct acggcattcc ggcctacggc    60
atcccggcaa aaggcattcc ggcctacggc                                     90
```

<210> SEQ ID NO 5
<211> LENGTH: 30
<212> TYPE: PRT
<213> ORGANISM: Artificial Sequence
<220> FEATURE:
<223> OTHER INFORMATION: EBP[Y2K4] block

<400> SEQUENCE: 5

```
Ile Pro Ala Lys Gly Ile Pro Ala Tyr Gly Ile Pro Ala Lys Gly Ile
1               5                   10                  15

Pro Ala Lys Gly Ile Pro Ala Tyr Gly Ile Pro Ala Lys Gly
            20                  25                  30
```

<210> SEQ ID NO 6
<211> LENGTH: 30
<212> TYPE: PRT
<213> ORGANISM: Artificial Sequence

```
<220> FEATURE:
<223> OTHER INFORMATION: EBP[Y3K3] block

<400> SEQUENCE: 6

Ile Pro Ala Tyr Gly Ile Pro Ala Lys Gly Ile Pro Ala Tyr Gly Ile
1               5                   10                  15
Pro Ala Lys Gly Ile Pro Ala Tyr Gly Ile Pro Ala Lys Gly
            20                  25                  30

<210> SEQ ID NO 7
<211> LENGTH: 30
<212> TYPE: PRT
<213> ORGANISM: Artificial Sequence
<220> FEATURE:
<223> OTHER INFORMATION: EBP[Y2K2I2] block

<400> SEQUENCE: 7

Ile Pro Ala Tyr Gly Ile Pro Ala Lys Gly Ile Pro Ala Ile Gly Ile
1               5                   10                  15
Pro Ala Tyr Gly Ile Pro Ala Lys Gly Ile Pro Ala Ile Gly
            20                  25                  30

<210> SEQ ID NO 8
<211> LENGTH: 30
<212> TYPE: PRT
<213> ORGANISM: Artificial Sequence
<220> FEATURE:
<223> OTHER INFORMATION: EBP[Y4K2] block

<400> SEQUENCE: 8

Ile Pro Ala Tyr Gly Ile Pro Ala Lys Gly Ile Pro Ala Tyr Gly Ile
1               5                   10                  15
Pro Ala Tyr Gly Ile Pro Ala Lys Gly Ile Pro Ala Tyr Gly
            20                  25                  30

<210> SEQ ID NO 9
<211> LENGTH: 13
<212> TYPE: PRT
<213> ORGANISM: Artificial Sequence
<220> FEATURE:
<223> OTHER INFORMATION: M1 block

<400> SEQUENCE: 9

Pro Gly Ala Ala Thr Val Ser His Thr Thr His His Ala
1               5                   10

<210> SEQ ID NO 10
<211> LENGTH: 16
<212> TYPE: PRT
<213> ORGANISM: Artificial Sequence
<220> FEATURE:
<223> OTHER INFORMATION: M2 block

<400> SEQUENCE: 10

Pro Gly Tyr Gly Tyr Gly Gly Leu Leu Gly Gly Leu Gly Leu His Tyr
1               5                   10                  15

<210> SEQ ID NO 11
<211> LENGTH: 31
<212> TYPE: PRT
<213> ORGANISM: Artificial Sequence
<220> FEATURE:
<223> OTHER INFORMATION: SBP block

<400> SEQUENCE: 11
```

```
Pro Pro Gly Ala Ala Thr Val Ser His Thr Thr His His Ala Pro Pro
1               5                   10                  15

Gly Tyr Gly Tyr Gly Gly Leu Leu Gly Gly Leu Gly Leu His Tyr
            20                  25              30

<210> SEQ ID NO 12
<211> LENGTH: 12
<212> TYPE: PRT
<213> ORGANISM: Artificial Sequence
<220> FEATURE:
<223> OTHER INFORMATION: A1H1

<400> SEQUENCE: 12

Ala Ala Thr Ala Val Ser His Thr Thr His His Ala
1               5                   10

<210> SEQ ID NO 13
<211> LENGTH: 30
<212> TYPE: PRT
<213> ORGANISM: Artificial Sequence
<220> FEATURE:
<223> OTHER INFORMATION: Formula 1
<220> FEATURE:
<221> NAME/KEY: REPEAT
<222> LOCATION: (1)..(30)
<223> OTHER INFORMATION: sequence may repeat 1 or more times
<220> FEATURE:
<221> NAME/KEY: VARIANT
<222> LOCATION: (4)..(4)
<223> OTHER INFORMATION: X is Y, K, or I
<220> FEATURE:
<221> NAME/KEY: VARIANT
<222> LOCATION: (9)..(9)
<223> OTHER INFORMATION: X is Y, K, or I
<220> FEATURE:
<221> NAME/KEY: VARIANT
<222> LOCATION: (14)..(14)
<223> OTHER INFORMATION: X is Y, K, or I
<220> FEATURE:
<221> NAME/KEY: VARIANT
<222> LOCATION: (19)..(19)
<223> OTHER INFORMATION: X is Y, K, or I
<220> FEATURE:
<221> NAME/KEY: VARIANT
<222> LOCATION: (24)..(24)
<223> OTHER INFORMATION: X is Y, K, or I
<220> FEATURE:
<221> NAME/KEY: VARIANT
<222> LOCATION: (29)..(29)
<223> OTHER INFORMATION: X is Y, K, or I

<400> SEQUENCE: 13

Ile Pro Ala Xaa Gly Ile Pro Ala Xaa Gly Ile Pro Ala Xaa Gly Ile
1               5                   10                  15

Pro Ala Xaa Gly Ile Pro Ala Xaa Gly Ile Pro Ala Xaa Gly
            20                  25              30

<210> SEQ ID NO 14
<211> LENGTH: 5
<212> TYPE: PRT
<213> ORGANISM: Artificial Sequence
<220> FEATURE:
<223> OTHER INFORMATION: EBP portion
<220> FEATURE:
<221> NAME/KEY: VARIANT
<222> LOCATION: (3)..(3)
<223> OTHER INFORMATION: X is G or A
<220> FEATURE:
<221> NAME/KEY: VARIANT
<222> LOCATION: (4)..(4)
<223> OTHER INFORMATION: X is any canonical amino acid except P
```

```
<400> SEQUENCE: 14

Val Pro Xaa Xaa Gly
1               5

<210> SEQ ID NO 15
<211> LENGTH: 29
<212> TYPE: PRT
<213> ORGANISM: Artificial Sequence
<220> FEATURE:
<223> OTHER INFORMATION: SBP block

<400> SEQUENCE: 15

Pro Gly Ala Ala Thr Val Ser His Thr Thr His His Ala Pro Gly Tyr
1               5                   10                  15

Gly Tyr Gly Gly Leu Leu Gly Gly Leu Gly Leu His Tyr
            20                  25
```